(12) United States Patent
Fisher

(10) Patent No.: US 11,461,377 B2
(45) Date of Patent: *Oct. 4, 2022

(54) GENERATING THREE-DIMENSIONAL SCENES FROM NATURAL LANGUAGE REQUESTS

(71) Applicant: Adobe Inc., San Jose, CA (US)

(72) Inventor: Matthew Fisher, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/101,891

(22) Filed: Nov. 23, 2020

(65) Prior Publication Data

US 2021/0103607 A1    Apr. 8, 2021

Related U.S. Application Data

(63) Continuation of application No. 16/189,669, filed on Nov. 13, 2018, now Pat. No. 10,853,398.

(51) Int. Cl.
*G06F 16/34* (2019.01)
*G06F 40/284* (2020.01)
(Continued)

(52) U.S. Cl.
CPC ............ *G06F 16/34* (2019.01); *G06F 40/284* (2020.01); *G06F 40/289* (2020.01); *G06T 19/20* (2013.01)

(58) Field of Classification Search
None
See application file for complete search history.

(56) References Cited

U.S. PATENT DOCUMENTS 7,043,695 B2    5/2006  Elber et al.
7,962,329 B1    6/2011  Coyne et al.
(Continued)

FOREIGN PATENT DOCUMENTS

CN         110599592 A      12/2019

OTHER PUBLICATIONS

Jie, "Efficient Dependency-Guided Named Entity Recognition", Proceedings of the Thirty-First AAAI Conference on Artificial Intelligence (AAAI-17) (Year: 2017).*

(Continued)

*Primary Examiner* — Yingchun He
(74) *Attorney, Agent, or Firm* — Keller Preece PLLC

(57) ABSTRACT

Methods, systems, and non-transitory computer readable storage media are disclosed for generating a three-dimensional scene based on a natural language phrase. For example, the disclosed system can analyze a natural language phrase to determine dependencies involving entities and commands in the natural language phrase. The disclosed system can then use the dependencies to generate an entity-command representation of the natural language phrase. Additionally, the disclosed system can generate a semantic scene graph for the natural language phrase from the entity-command representation to indicate contextual relationships of the entities and commands. Furthermore, the disclosed system generates the requested three-dimensional scene by using at least one scene of a plurality of available three-dimensional scenes identified using the semantic scene graph of the natural language phrase.

20 Claims, 10 Drawing Sheets

(51) Int. Cl.
G06F 40/289 (2020.01)
G06T 19/20 (2011.01)

(56) References Cited

U.S. PATENT DOCUMENTS

| | | |
|---|---|---|
| 9,633,048 B1 | 4/2017 | Dutta et al. |
| 2006/0217979 A1 | 9/2006 | Pahud et al. |
| 2009/0058860 A1 | 3/2009 | Fong et al. |
| 2014/0160134 A1 | 6/2014 | Bekmambetov |
| 2018/0329889 A1 | 11/2018 | Badr et al. |

OTHER PUBLICATIONS

Akshay, "Text2Scene: Language-Driven Synthesis of 3D Scenes from Scene Databases", downloaded @ https://www.youtube.com/watch?v=zUgxhF8f6Tc, published on Sep. 10, 2018 (Year: 2018).*
Choi "Natural Language Processing", Winter 2017 (Year: 2017).*
Angel Chang, Will Monroe, Manolis Savva, Christopher Potts, and Christopher D. Manning. 2015b. Text to 3D Scene Generation with Rich Lexical Grounding. In Association for Computational Linguistics and International Joint Conference on Natural Language Processing (ACL-IJCNLP).
Angel X. Chang, Mihail Eric, Manolis Savva, and Christopher D. Manning 2017. SceneSeer: 3D Scene Design With Natural Language. CORR Abs/1703.00650 (2017). http://arxiv.org/abs/1703.00050.
Angel X. Chang, Thomas Funkhouser, Leonidas Guibas, Pat Hanrahan, Qixing Huang, Zimo Li, Silvio Savarese, Manolis Savva, Shuran Song, Hao Su, Jianxiong Xiao, Li Yi, and Fisher Yu. 2015a. ShapeNet: An Information-Rich 3D Model Repository. (2015).
Angel X. Chang, Manolis Savva, and Christopher D. Manning 2014a. Interactive Learning of Spatial Knowledge for Text to 3D Scene Generation. In Proc. ACL Workshop on Interactive Language Learning, Visualization, and Interfaces (ILLVI).
Angel X. Chang, Manolis Savva, and Christopher D. Manning. 2014b. Learning Spatial Knowledge for Text to 3D Scene Generation. In Empirical Methods in Natural Language Processing (EMNLP).
Bob Coyne, Alex Klapheke, Masoud Rouhizadeh, Richard Sproat, and Daniel Bauer. 2012. Annotation Tools and Knowledge Representation for a Text-To-Scene System. In COLING. 679-694.
Bob Coyne and Richard Sproat. 2001. WordsEye: An Automatic Text-to-scene Conversion System. In Proc. of SIGGRAPH. 487-496.
Matthew Fisher, Yangyan Li, Manolis Savva, Pat Hanrahan, and Matthias Nießner. 2015. Activity-centric Scene Synthesis for Functional 3D Scene Modeling. ACM Trans. on Graph. 34, 6 (2015), 212:1-10.
Matthew Fisher, Daniel Ritchie, Manolis Savva, Thomas Funkhouser, and Pat Hanrahan. 2012. Example-based synthesis of 3D object arrangements. ACM Trans. on Graph. 31, 6 (2012), 135:1-11.
Matthew Fisher, Manolis Savva, and Pat Hanrahan. 2011. Characterizing structural relationships in scenes using graph kernels. 30, 4 (2011), 34.
S. Guadarrama, L. Riano, D. Golland, D. Göhring, Y. Jia, D. Klein, P. Abbeel, and T. Darrell. 2013. Grounding Spatial Relations for Human-Robot Interaction. In Proc. IEEE Int. Conf. on Intelligent Robots & Systems. 1640-1647.
Ruizhen Hu, Chenyang Zhu, Oliver van Kaick, Ligang Liu, Ariel Shamir, and Hao Zhang. 2015. Interaction Context (ICON): Towards a Geometric Functionality Descriptor. ACM Trans. on Graph. 34, 4 (2015), Article 83.
Binh-Son Hua, Quang-Hieu Pham, Duc Thanh Nguyen, Minh-Khoi Tran, Lap-Fai Yu, and Sai-Kit Yeung. 2016. SceneNN: A Scene Meshes Dataset with aNNotations. In Proc. of 3D Vision.
Yun Jiang, Marcus Lim, and Ashutosh Saxena. 2012. Learning Object Arrangements in 3D Scenes using Human Context. In Proc. Int. Conf. on Machine Learning (ICML).
Young Min Kim, Niloy J. Mitra, Dong-Ming Yan, and Leonidas Guibas. 2012. Acquiring 3D Indoor Environments with Variability and Repetition. ACM Trans. on Graph. 31, 6 (2012), 138:1-138:11.
Rui Ma, Honghua Li, Changqing Zou, Zicheng Liao, Xin Tong, and Hao Zhang. 2016. Action-Driven 3D Indoor Scene Evolution. ACM Trans. on Graph. 35, 6 (2016).
Lucas Majerowicz, Ariel Shamir, Alla Sheffer, and Holger H. Hoos. 2014. Filling Your Shelves: Synthesizing Diverse Style-Preserving Artifact Arrangements. IEEE Trans. Visualization & Computer Graphics 20, 11 (2014), 1507-1518.
Christopher D. Manning, Mihai Surdeanu, John Bauer, Jenny Finkel, Steven J. Bethard, and David McClosky. 2014. The Stanford CoreNLP Natural Language Processing Toolkit. In Association for Computational Linguistics (ACL) System Demonstrations. 55-60. http://www.aclweb.org/anthology/P/P14/P14-5010.
Paul Merrell, Eric Schkufza, Zeyang Li, Maneesh Agrawala, and Vladlen Koltun. 2011. Interactive Furniture Layout Using Interior Design Guidelines. ACM Trans. on Graph. 30, 4 (2011), 87:1-10.
Dipendra Kumar Misra, Jaeyong Sung, Kevin Lee, and Ashutosh Saxena. 2014. Tell Me Dave: Context-Sensitive Grounding of Natural Language to Manipulation Instructions. In Proc. of Robotics: Science and Systems.
Zeinab Sadeghipour, Zicheng Liao, Ping Tan, and Hao Zhang. 2016. Learning 3D Scene Synthesis from Annotated RGB-D Images. Computer Graphics Forum (SGP) 35, 5 (2016).
Manolis Savva, Angel X. Chang, and Pat Hanrahan. 2015. Semantically-Enriched 3D Models for Common-sense Knowledge. CVPR 2015 Workshop on Functionality, Physics, Intentionality and Causality (2015).
Manolis Savva, Angel X. Chang, Pat Hanrahan, Matthew Fisher, and Matthias Nießner. 2016. PiGraphs: Learning Interaction Snapshots from Observations. ACM Trans. on Graph. 35, 4 (2016).
Steven M. Seitz, Brian Curless, James Diebel, Daniel Scharstein, and Richard Szeliski. 2006. A Comparison and Evaluation of Multi-View Stereo Reconstruction Algorithms. In IEEE CVPR. 519-528.
Lee M. Seversky and Lijun Yin. 2006. Real-time Automatic 3D Scene Generation from Natural Language Voice and Text Descriptions. In Proc. of ACM International Conference on Multimedia. 61-64.
Tianjia Shao, Weiwei Xu, Kun Zhou, Jingdong Wang, Dongping Li, and Baining Guo. 2012. An interactive approach to semantic modeling of indoor scenes with an RGBD camera. ACM Trans. on Graph. 31, 6 (2012), 136:1-11.
N. Silberman, D. Hoiem, P. Kohli, and R. Fergus. 2012. Indoor segmentation and support inference from RGBD images. In ECCV.
Greg Slabaugh, Bruce Culbertson, Tom Malzbender, and Ron Schafer. 2001. A Survey of Methods for Volumetric Scene Reconstruction from Photographs. In Proc. of Eurographics Conference on Volume Graphics. 81-101.
Shuran Song, Samuel P. Lichtenberg, and Jianxiong Xiao. 2015. SUN RGB-D: A RGB-D scene understanding benchmark suite. In IEEE CVPR. 567-576.
Shuran Song, Fisher Yu, Andy Zeng, Angel X Chang, Manolis Savva, and Thomas Funkhouser. 2017. Semantic scene completion from a single depth image. In Computer Vision and Pattern Recognition (CVPR), 2017 IEEE Conference on. IEEE, 190-198.
Moritz Tenorth and Michael Beetz. 2013. KnowRob: a Knowledge Processing Infrastructure for Cognition-enabled Robots. Int. J. Rob. Res. 32, 5 (2013), 566-590.
Kai Wang, Manolis Savva, Angel X. Chang, and Daniel Ritchie. 2018. Deep Convolutional Priors for Indoor Scene Synthesis. ACM Trans. on Graphics (Proc. of SIGGRAPH) 1609 37, 4 (2018).
Jianxiong Xiao. 2012. 3D Reconstruction is Not Just a Low-level Task: Retrospect and Survey. Technical Report. MIT9.S912: What is Intelligence?
Kai Xu, Rui Ma, Hao Zhang, Chenyang Zhu, Ariel Shamir, Daniel Cohen-Or, and Hui Huang. 2014. Organizing Heterogeneous Scene Collection through Contextual Focal Points. ACM Trans. on Graph. 33, 4 (2014), Article 35.

(56) References Cited

OTHER PUBLICATIONS

Kai Xu, Yifei Shi, Lintao Zheng, Junyu Zhang, Min Liu, Hui Huang, Hao Su, Daniel Cohen-Or, and Baoquan Chen. 2016. 3D Attention-Driven Depth Acquisition for Object Identification. ACM Trans. on Graph. 35, 6 (2016).

Lap-Fai Yu, Sai Kit Yeung, Chi-Keung Tang, Demetri Terzopoulos, Tony F. Chan, and Stanley Osher. 2011. Make it home: automatic optimization of furniture arrangement. ACM Trans. on Graph. 30, 4 (2011), 86:1-12.

Lap-Fai Yu, Sai Kit Yeung, and Demetri Terzopoulos. 2016. The Clutterpalette: An Interactive Tool for Detailing Indoor Scenes. IEEE Trans. Visualization & Computer Graphics 22, 2 (2016), 1138-1148.

C. Lawrence Zitnick, Devi Parikh, and Lucy Vanderwende. 2013. Learning the Visual Interpretation of Sentences. In Proc. ICCV. 1681-1688.

Sturla, "A tow-Phased Approach for Natural Language Parsing into Formal Logic", Submitted to Dept. of EECS on May 26, 2017, in partial fulfilment of the requirements for the degree of Master of Engineering in EECS (Year: 2017).

Ma, "Automatic Conversion of Natural Language to 3D Animation", a thesis submitted in partial fulfillment of the requirements for the degree of Doctor of Philosophy, Jul. 2006 (Year: 2006).

Combined Search and Examination Report as received in UK application GB1912558.2 dated Feb. 10, 2020.

U.S. Appl. No. 16/189,669, filed Jan. 2, 2020, Office Action.
U.S. Appl. No. 16/189,669, filed May 6, 2020, Office Action.
U.S. Appl. No. 16/189,669, filed Jul. 23, 2020, Notice of Allowance.
Examination Report as received in UK application GB1912558.2 dated Aug. 20, 2021.
Examination Report as received in Australian application 2019226135 dated Jun. 24, 2021.
Notice of Grant as received in Australian application 2019226135 dated Nov. 4, 2021.
Angel Chang, Will Monroe, Manolis Savva, Christopher Potts, and Christopher D. Manning. 2015b. Text to 3D Scene Generation with Rich Lexical Grounding. In Association for Computational Linguistics and International Joint Conference on Natural Language Processing KACL-IJCNLP).
Angel X. Chang, Mihail Eric, Manolis Savva, and Christopher D. Manning. 2017. SceneSeer: 3D Scene Design with Natural Language. CoRR abs/1703.00050 (2017). http://arxiv.org/abs/1703.00050.
Manolis Savva, Angel X. Chang, Pat Hanrahan, Matthew Fisher, and Matthias Nießer. 2016. PiGraphs: Learning Interaction Snapshots from Observations. ACM Trans. on Graph. 35, 4 (2016).
Examination Report as received in UK application GB1912558.2 dated Jan. 13, 2022.
Examination Report as received in UK application GB1912558.2 dated Jun. 10, 2022.

\* cited by examiner

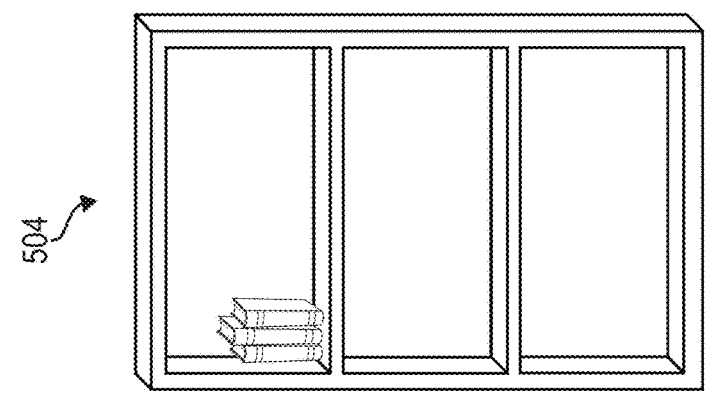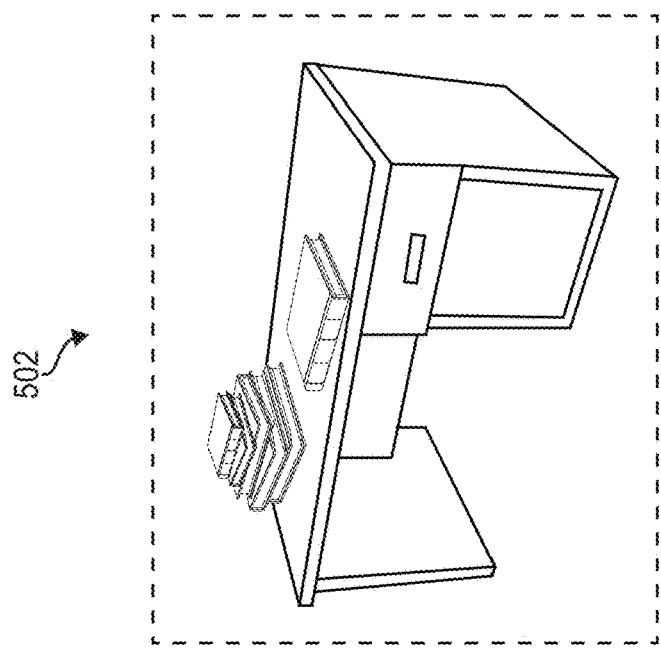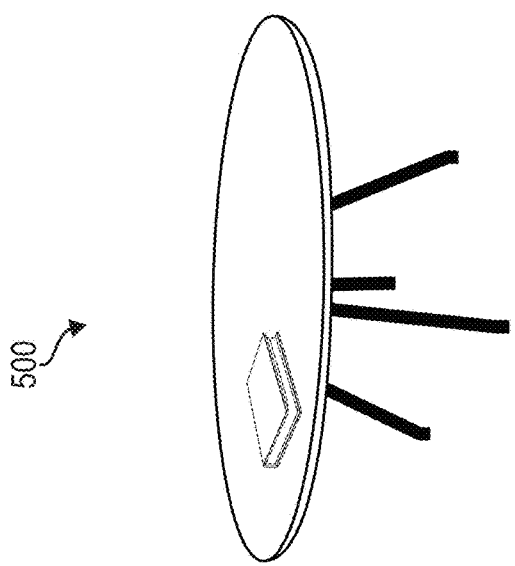
Fig. 5

GENERATING THREE-DIMENSIONAL SCENES FROM NATURAL LANGUAGE REQUESTS

CROSS-REFERENCE TO RELATED APPLICATIONS

The present application is a continuation of U.S. application Ser. No. 16/189,669, filed on Nov. 13, 2018. The aforementioned application is hereby incorporated by reference in its entirety.

BACKGROUND

Recent advances in computational design, virtual/augmented reality (VR/AR), and robotics technologies are placing an increasing demand for three-dimensional digital content. For example, many computer-aided design or VR/AR systems utilize three-dimensional models. High-quality three-dimensional models can significantly improve the aesthetic design, realism, and immersion within a three-dimensional environment.

Conventional systems typically utilize software applications that allow content creators to create three-dimensional digital content using a wide variety of tools. Conventional software applications provide a high degree of customization and precision, allowing content creators to generate anything from basic three-dimensional shapes to highly detailed, complex three-dimensional scenes with many three-dimensional objects. While the conventional systems provide a great deal of control to content creators, such applications have a large number of tools to perform a large number of operations. Using conventional systems to create three-dimensional scenes thus usually requires a significant amount of training to learn to use the content creation tools, which can provide a high barrier to entry for new users. Accordingly, the creation of three-dimensional digital content is limited by the expertise and ability of the content creators.

Furthermore, even when a user is skilled and knowledgeable, conventional systems often require navigating between various user interfaces and/or various control menus in order to generate a three-dimensional scene. Thus, creating a 3D scene using conventional systems is both time consuming and inefficient even for skilled and knowledgeable users.

These and other disadvantages exist with regard to conventional systems for creating three-dimensional digital content.

SUMMARY

One or more embodiments provide benefits and/or solve one or more of the foregoing or other problems in the art with systems, methods, and non-transitory computer readable storage media that intelligently generate three-dimensional digital content based on natural language requests. More particularly, the disclosed systems include a framework that generates language-based representations of existing 3D scenes that encode geometric and semantic scene information about the 3D scenes. Upon receiving a natural language command to generate or modify a 3D scene, the disclosed systems also generate a representation of the natural language phrase that encodes geometric and semantic information and relationships to commands. The disclosed systems then map the natural language representation to one or more language-based representations of a 3D scene or sub-scene. The disclosed systems then generate or modify a 3D scene based on the natural language command using the identified 3D scene or sub-scene.

For example, in one or more embodiments, the disclosed systems analyze a natural language phrase requesting to generate a three-dimensional scene to determine dependencies involving one or more entities and/or commands of the natural language phrase. Specifically, the disclosed systems utilize the dependencies involving entity(ies) and command(s) to generate an entity-command representation of the natural language phrase annotated with attributes and relationships of the entity(ies) and command(s). Furthermore, the disclosed systems generate a three-dimensional scene based on the entity-command representation using at least one three-dimensional scene from a database of previously generated three-dimensional scenes. Specifically, the disclosed systems can select a three-dimensional scene from the database by correlating the entity-command representation to a semantic scene graph of a three-dimensional scene. Thus, the disclosed systems can efficiently, flexibly, and accurately generate three-dimensional scenes from natural language requests by determining representations of the requests that allow for comparison to representations of existing three-dimensional scenes.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIG. 5 illustrates a diagram of selecting a previously generated three-dimensional scene in accordance with one or more implementations;

DETAILED DESCRIPTION

Figure 1:
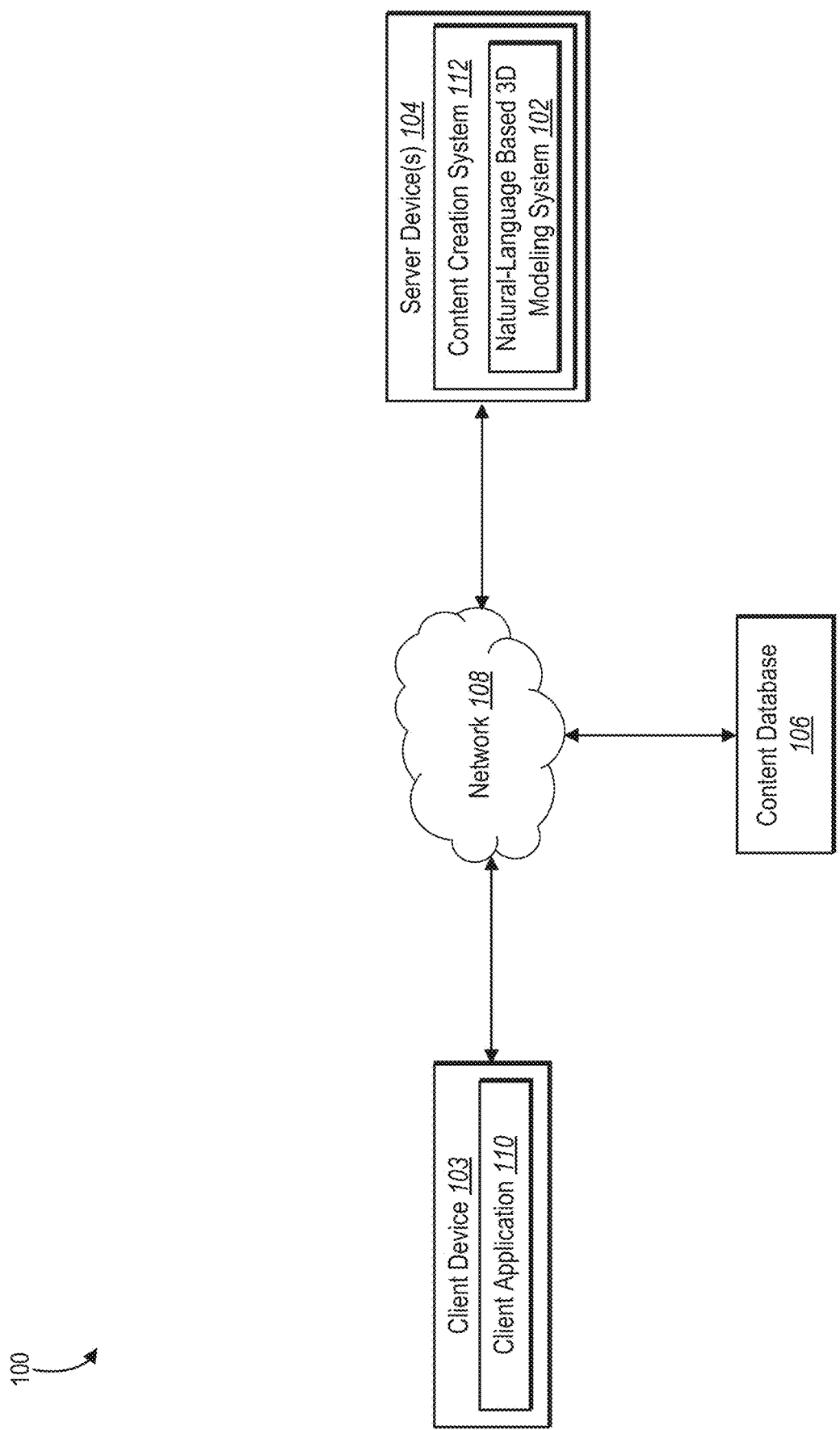
FIG. 1 illustrates an example environment in which a three-dimensional 3D modeling system can operate in accordance with one or more implementations.

One or more embodiments of the present disclosure include a natural-language based three-dimensional modeling system (also "natural-language based 3D system" or simply "3D modeling system") that generates three-dimensional scenes based on natural language requests. For example, the 3D modeling system uses natural language processing to analyze natural language phrases and determine dependencies involving components of the natural language phrases. In particular, the 3D modeling system can determine relationships between various nouns and/or verbs in a phrase and generate an entity-command representation of the phrase based on the determined relationships. Furthermore, the 3D modeling system also generates semantic scene graphs for existing 3D scenes and sub-scenes. The semantic scene graphs encode geometric and semantic scene information about the 3D scenes. The 3D modeling system then maps the entity-command representation of the phrase to a semantic scene graph of an existing three-dimensional scene. The 3D modeling system the uses the identified three-dimensional scenes to generate a three-dimensional scene to fulfill the request in the natural language phrase. By generating a sematic scene graph based on an entity-command representation of a natural language request, the 3D modeling system can speed up and simplify the process of generating a three-dimensional scene by quickly finding existing three-dimensional scenes that correspond to the content of the request.

As mentioned, the 3D modeling system can use natural language processing to analyze a natural language phrase including a request to generate a three-dimensional scene. In one or more embodiments, the 3D modeling system uses natural language processing to transform the natural language phrase into a representation that the 3D modeling system can use to compare to similar representations of existing three-dimensional scenes. Specifically, the 3D modeling system labels one or more entities and one or more commands in a natural language phrase and then determines dependencies involving the entities and commands. For instance, the 3D modeling system can determine dependencies by parsing the natural language phrase and creating a dependency tree that assigns parent tokens and annotation labels to each token in the phrase.

In one or more embodiments, the 3D modeling system uses the determined dependencies to generate an entity-command representation of the natural language phrase. In particular, the 3D modeling system converts a dependency representation (e.g., the dependency tree) of the phrase tokens into an entity-command representation that provides a detailed graph representation of the components and their relationships of the natural language phrase. To illustrate, an entity-command representation can include a list of entities annotated with corresponding attributes and relationships and a list of command verbs which operate over the entities.

In one or more additional embodiments, the 3D modeling system determines a canonical entity-command representation for a plurality of natural language phrases that include the same conceptual request. For instance, the 3D modeling system can determine that there are a number of different ways to phrase a request to build the same three-dimensional scene. Because the phrases include different parsing structures, the 3D modeling system creates a different entity-command representation for each form. The 3D modeling system can then select a descriptive form of the entity-command representation as a canonical entity-command representation so that future requests including the same conceptual request utilize the canonical entity-command representation.

After generating the entity-command representation for a natural language phrase, the 3D modeling system generates a semantic scene graph for the natural language phrase. Specifically, the 3D modeling system converts the entity-command representation to a semantic scene graph for use in generating the three-dimensional scene. For example, the 3D modeling system determines object categories, entity counts, qualifiers, and relationships from the entity-command representation. To illustrate, the 3D modeling system includes object nodes, relationship nodes, and edge nodes based on the determined information to represent the relative positioning and relationships of objects within the requested three-dimensional scene.

Using the 3D scene graph constructed for the natural language phrase, the 3D modeling system then generates the three-dimensional scene. In one or more embodiments, the 3D modeling system uses at least one three-dimensional scene from a database of available three-dimensional scenes from a database to generate the three-dimensional scene. For example, the 3D modeling system can compare the semantic scene graph of the natural language phrase to semantic scene graphs of the available three-dimensional scenes to select at least one of the scenes that most closely matches the semantic scene graph of the natural language phrase.

As mentioned, the 3D modeling system provides a number of advantages over conventional systems. For example, the 3D modeling system improves the flexibility of a three-dimensional scene generation process. In particular, the 3D modeling system improves flexibility by allowing users to use natural language phrases to generate three-dimensional scenes. By using natural language requests, the 3D modeling system improves the accessibility of three-dimensional modeling programs to inexperienced users by improving the input methods available to users when generating three-dimensional scenes. In contrast, conventional systems typically require users to have an in-depth understanding of modeling tools and how to use them.

Furthermore, the 3D modeling system improves the speed and efficiency of a three-dimensional scene generation process. Specifically, by constructing an object representation (e.g., semantic scene graph) of a natural language phrase for use in generating a three-dimensional scene, the 3D modeling system reduces the time required to generate the three-dimensional scene. For instance, in contrast to conventional systems that require a user to use a number of three-dimensional modeling tools to generate each object within a scene, the 3D modeling system described herein can interpret a natural language request for a three-dimensional scene and then quickly generate the three-dimensional scene without the use of any additional tools. Thus, the 3D modeling system improves upon conventional user interfaces and modeling system by increasing the efficiency of computing devices through the use of natural language based generation of 3D scenes.

In addition to the foregoing, the 3D modeling system improves consistency and reduces complexity in determining requests and generating three-dimensional scenes based on natural language phrases. In particular, the 3D modeling system determines canonical entity-command representations that can be used to represent various different forms for a conceptual request (i.e., scene editing/constructing concept). For example, the 3D modeling system can determine that a specific form (e.g., descriptive form) of an entity-command representation is a canonical entity-command representation that represents the different forms of requests for generating/editing a three-dimensional scene.

Additionally, the 3D modeling system improves the accuracy of a three-dimensional scene generation process. In particular, by creating a semantic scene graph of a natural language phrase based on an entity command representation of the phrase, the 3D modeling system generates a representation of the phrase that the system can use in identifying similar, existing three-dimensional scenes. The semantic scene graph provides the 3D modeling system a representation that the 3D modeling system can easily compare to available three-dimensional scenes in a database of three-dimensional scenes so that the 3D modeling system can accurately determine relationships between objects within the three-dimensional scene based on the request.

As illustrated by the foregoing discussion, the present disclosure utilizes a variety of terms to describe features and advantages of the 3D modeling system. Additional detail is now provided regarding the meaning of the terms. For example, as used herein, the term "natural language phrase" refers to text or speech including ordinary language employed by a user. Specifically, a natural language phrase can include text or speech without a special syntax or formal construction configured specifically for interacting with a computing device. For example, a natural language phrase can include conversational request to generate or modify a scene. To illustrate, users can use natural language when speaking or otherwise entering a request into a computing device.

As used herein, the term "three-dimensional scene" refers to a digital representation of one or more objects in a three-dimensional environment. For example, a three-dimensional scene can include any number of digital objects in one or more locations within a three-dimensional environment according to a set of coordinate axes (e.g., x-axis, y-axis, z-axis). To illustrate, displaying objects of a three-dimensional scene on a display device of a computing device involves using mathematical positioning of the objects on the coordinate axes to reconstruct the objects on the display device. Reconstructing a three-dimensional scene takes into account the size and shape of each object based on coordinates for a plurality of vertices that the computing device uses to reconstruct the object. The mathematical positioning also allows the computing device to present the relative positioning of the objects with respect to each other.

As used herein, the terms "entity" and "command" refer to components of speech or text of phrases analyzed by a natural language processor. Specifically, the 3D modeling system uses a natural language processor to identify tokens in a sentence by identifying character strings with an assigned/identified meaning. The 3D modeling system then labels the tokens as entities or commands. As used herein, the term "entity" refers to an identified noun within a sentence that meets a set of conditions including determining that the noun is not in a compound dependency relationships with another noun, the noun is not an abstract concept, and the noun does not represent a spatial region. In particular, an entity can include a base noun associated (e.g., annotated) with one or more attributes, counts, relationships, or determiners based on the structure of the sentence. As used herein, the term "command" refers to an identified command verb which operates over one or more entities. Specifically, a command can include a base verb associated with one or more attributes or targets. Examples of entities and commands are described in more detail below. In one or more embodiments, the 3D modeling system labels all verbs in base form as commands.

As used herein, the term "entity-command representation" refers to a logical representation of entities and commands, and their relationships, in a natural language phrase. Specifically, an entity-command representation includes a list of entities annotated with attributes and relationships and a list of command verbs which operate over the entities. As described in more detail below, an entity-command representation can also be illustrated as a diagram of boxes that indicate attributes and relationships (e.g., dependencies) between the different components of a natural language phrase.

As used herein, the term "semantic scene graph" refers to a graph representation of a three-dimensional scene that includes geometric information for objects in the scene and semantic information for the scene. In particular, a semantic scene graph can include object instances and object-level attributes, in addition to object relations indicating relative positioning of the object instances (e.g., pairwise and group-wise). Additionally, a semantic scene graph includes two node types (object nodes and relationship nodes) with edges that connect object nodes and relationship nodes. A semantic scene graph can thus represent object relationships and compositions in both natural language phrases and three-dimensional scene data.

Additional detail will now be provided regarding the 3D modeling system in relation to illustrative figures portraying exemplary implementations. To illustrate, FIG. 1 includes an embodiment of an environment 100 in which a natural-language 3D modeling system 102 can operate. In particular, the environment 100 includes a client device 103 associated with a user, server device(s) 104, and a content database 106 in communication via a network 108. Moreover, as shown, the client device 103 includes a client application 110. Furthermore, the server device(s) 104 include a content creation system 112, which includes the 3D modeling system 102.

The content database 106 is a database that contains a plurality of existing/available three-dimensional scenes or subscenes. Specifically, the content database 106 includes three-dimensional scenes with different objects and/or arrangements of objects. As described below, the content database 106 provides a variety of different three-dimensional scenes that the 3D modeling system 102 can use in generating three-dimensional scenes from natural language phrases. In one or more embodiments, the content database 106 includes content from a plurality of content creators. Additionally, the content database 106 can be associated with the content creation system 112 (e.g., including content from users of the content creation system 112) and/or a third-party system (e.g., including content from users of the third-party system).

In one or more embodiments, the 3D modeling system 102 also accesses the content database 106 to obtain semantic scene graph information for the plurality of available three-dimensional scenes. In particular, the 3D modeling system 102 can obtain semantic scene graphs of the plurality of available three-dimensional scenes in the content database 106. The 3D modeling system 102 can obtain the semantic scene graphs by analyzing the three-dimensional scenes and then generating the semantic scene graphs. Alternatively, the 3D modeling system 102 obtains pre-generated semantic scene graphs from the content database 106 or third-party system.

As mentioned, the server device(s) 104 can host or implement the content creation system 112. The content creation system 112 can manage content creation for a plurality of users. The content creation system 112 can include, or be associated with, a plurality of content creation applications that allow the plurality of users to create and otherwise interact with a variety of types of digital content. The content creation system can also provide content storage and sharing capability (e.g., via the content database 106) so that content creators can view content of other content creators.

Furthermore, in one or more embodiments, the 3D modeling system 102 communicates with the client device 103 via the network 108 to receive one or more requests to generate three-dimensional scenes. For instance, the client device 103 can include a client application 110 that enables communication with the natural-language based 3D modeling system 102. For example, the client application 110 can comprise a web browser or a native computing device. In an example implementation, a user of the client device 103 can use the client application 110 to input a natural language phrase that includes a request to generate a three-dimensional scene. To illustrate, the client application 110 can allow the user to input a natural language phrase using a keyboard input or a voice input. For voice inputs, the client application 110 or the 3D modeling system 102 can convert the voice inputs to a text input (e.g., using speech-to-text analysis).

The 3D modeling system 102 can receive a natural language phrase from the client device 103 and then analyze the natural language phrase to determine the request. Specifically, the 3D modeling system 102 parses the natural language phrase to identify components and corresponding dependencies of the natural language phrase. The 3D modeling system 102 uses the components and dependencies to generate an entity-command representation for the natural language phrase. Based on the entity-command representation, the 3D modeling system 102 generates a semantic scene graph for the natural language phrase to indicate the objects and their relative positions within a three-dimensional scene.

The 3D modeling system 102 generates a three-dimensional scene based on the semantic scene graph of the natural language phrase. In one or more embodiments, the 3D modeling system 102 compares the semantic scene graph of the natural language phrase to semantic scene graphs of the plurality of available three-dimensional scenes in the content database 106 to select one or more three-dimensional scenes. The 3D modeling system 102 can then use the selected scenes to generate a three-dimensional scene that fulfills the natural language request received from the client device 103. The 3D modeling system 102 can also allow the user to modify the generated three-dimensional scene using one or more additional natural language phrases. After generating the three-dimensional scene, the 3D modeling system 102 can store the three-dimensional scene at the content database 106 for using to generate future three-dimensional scenes.

Although the environment of FIG. 1 is depicted as having various components, the environment 100 may have any number of additional or alternative components (e.g., any number of server devices, client devices, content databases, or other components in communication with the 3D modeling system 102). For example, the 3D modeling system 102 can allow any number of users associated with any number of client devices to generate three-dimensional scenes. Furthermore, the 3D modeling system 102 can communicate with any number of content databases to access existing three-dimensional scenes for use in generating three-dimensional scenes based on natural language requests. Additionally, more than one component or entity in the environment 100 can implement the operations of the 3D modeling system 102 described herein. For instance the 3D modeling system 102 can alternatively be implemented entirely (or in part) on the client device 103 or on separate client devices.

Figure 2:
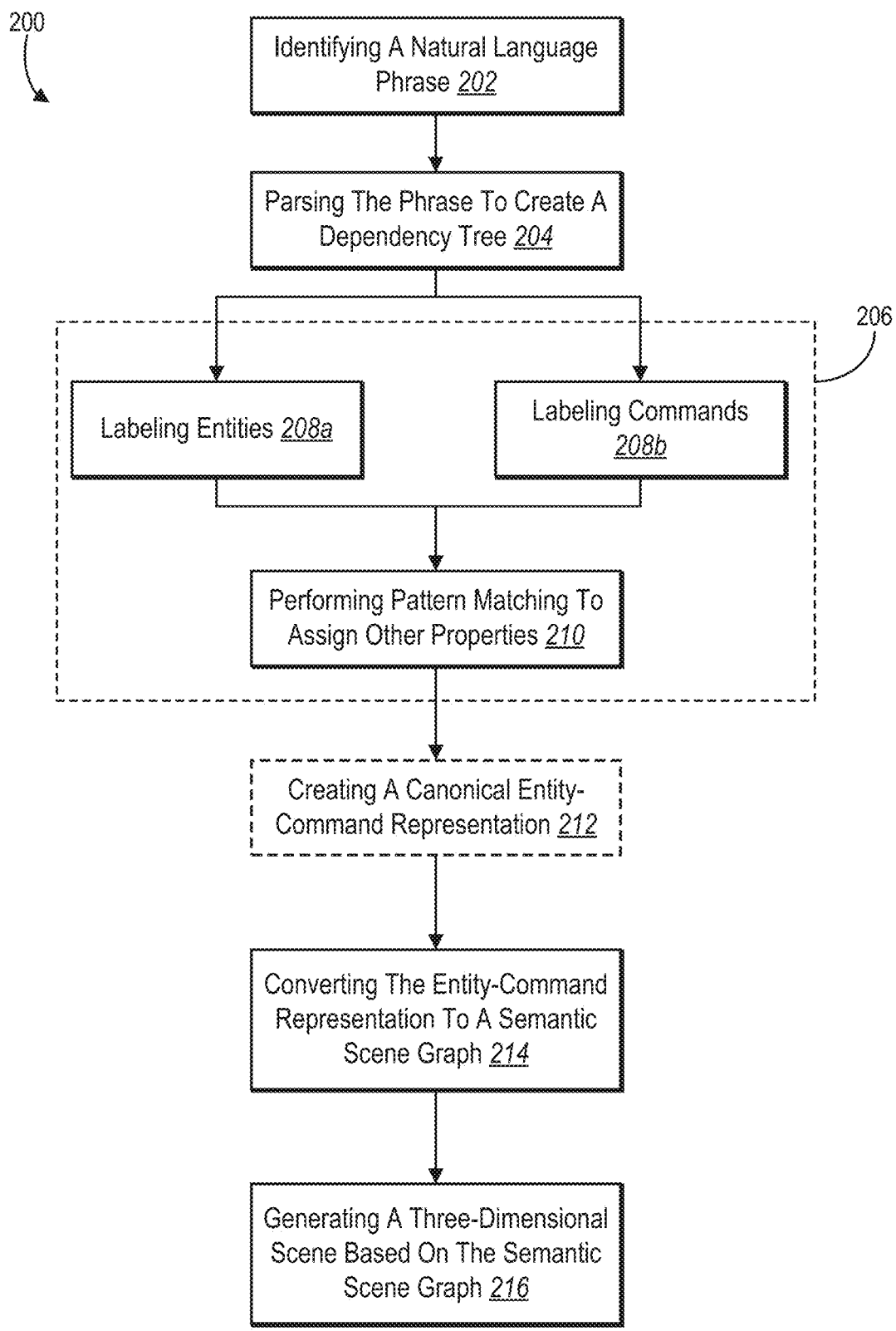
FIG. 2 illustrates a diagram of a process of generating a three-dimensional scene from a natural language phrase in accordance with one or more implementations.

As mentioned above, the 3D modeling system 102 can parse a natural language phrase to generate a semantic scene graph for the phrase for use in generating a three-dimensional scene. FIG. 2 illustrates a diagram of a process of generating a three-dimensional scene from a natural language phrase. In particular, the process includes a series of acts 200 in which the 3D modeling system 102 processing the natural language phrase to convert the natural language phrase into a form that the 3D modeling system 102 can use to compare to already existing three-dimensional scenes.

In one or more embodiments, the series of acts 200 includes a first act 202 of identifying a natural language phrase. Specifically, the 3D modeling system 102 identifies a natural language phrase based on a user input by a user. The user input can include a text input (e.g., via keyboard or touchscreen) or a voice input (e.g., via microphone). The 3D modeling system 102 can also determine that a user input includes a plurality of natural language phrases and then process each phrase individually. Alternatively, the 3D modeling system 102 can determine that a plurality of natural language phrases combine to form a single request and process the plurality of natural language phrases together.

After identifying the natural language phrase, the series of acts 200 includes an act 204 of parsing the phrase to create a dependency tree. In one or more embodiments, the 3D modeling system uses natural language processing to analyze the natural language phrase. For example, the 3D modeling system uses natural language processing to parse the natural language phrase to determine the different speech components of the phrase and the relationships and dependencies between the components within the phrase. One way in which a natural language processor can determine these dependencies is by creating a dependency tree.

A dependency tree (or a dependency-based parse tree) is a tree that includes a plurality of nodes with dependency grammars. For example, in one or more embodiments the nodes in a dependency tree are all terminal, such that there is no distinction between terminal (formal grammar elements) and non-terminal (syntactic variables) categories, as in the case of constituency-based parse trees. Furthermore, in one or more embodiments a dependency tree has fewer nodes than a constituency-based parse tree because a dependency tree lacks phrasal categories (e.g., sentence, noun phrase, and verb phrase). Rather, a dependency tree includes a structure that indicates dependency relations of components of a natural language phrase by setting a verb as the structural center (e.g., first parent node) of the dependency tree and then building the tree based on the noun dependencies (whether direct or indirect) relative to the verb node.

In one or more embodiments, the 3D modeling system converts a natural language phrase into a dependency tree by first identifying tokens of the natural language phrase. As previously mentioned, tokens include character strings that have an identified meaning (e.g., words). The 3D modeling system then assigns an annotation label to each token in the natural language phrase. This includes identifying nouns, verbs, adjectives, etc., in the natural language phrase and then determining the dependencies of each component of the phrase relative to the other components in the phrase. An example of assigning parent tokens and annotation labels to each token in a phrase is described in more detail below with respect to FIG. 3A. According to at least some embodiments, the 3D modeling system uses an established framework for determining lexical dependencies (e.g., the Universal Dependencies framework).

The series of acts 200 includes an act 206 of generating an entity-command representation of the natural language phrase. In one or more embodiments, the 3D modeling system converts the low-level dependency representation of the natural language phrase in the dependency tree into the entity-command representation by labeling the different components from the dependency tree. Specifically, generating the entity-command representation involves an act 208a of labeling entities and an act 208b of labeling commands. According to one or more embodiments, the 3D modeling system 102 labels the entities and commands of the natural language phrase by analyzing the natural language phrase to identify specific types of speech components and then give the identified types of speech components a corresponding label. For example, as described in more detail with respect to FIGS. 3A and 3B, the 3D modeling system labels all nouns in a sentence as entities unless one of several conditions are met: 1) the noun is in a compound dependency relationship with another noun (e.g., "computer" in "computer desk"); 2) the noun is an abstract concept (e.g., "addition," "appeal"); or 3) the noun represents a special region (e.g., "right," "side"). Furthermore, the 3D modeling system labels all verbs in base form as commands.

Furthermore, when labeling the entities, the 3D modeling system 102 dereferences pronouns. In particular, the 3D modeling system 102 replaces pronouns in the natural language phrase with the corresponding noun in the phrase to identify the associated relationships involving the base noun instead of creating a new entity in the entity-command representation for the pronoun itself. For instance, the 3D modeling system can use coreference information from a natural language processing framework (e.g., the Stanford CoreNLP framework). The 3D modeling system 102 does not use such coreference information if there is ambiguity for non-pronoun scenarios that may refer to two or more different objects in the natural language phrase (or in more than one natural language phrase). In such instances, the 3D modeling system 102 resolves the ambiguity when aligning entities to objects in the requested three-dimensional scene.

Figure 3B:
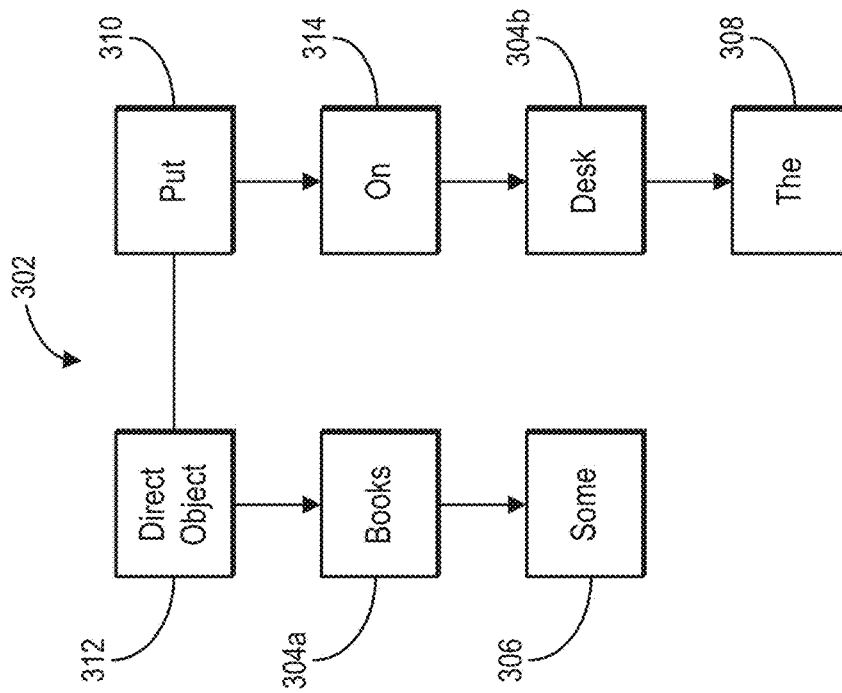
FIGS. 3A-3C illustrate diagrams of a process of parsing a natural language phrase in accordance with one or more implementations.

Generating the entity-command representation can involve an act 210 of performing pattern matching to assign other properties to the labeled entities and commands. In one or more embodiments, the 3D modeling system 102 uses pattern matching over the dependency tree to assign properties that are not labeled as entities or commands. Specifically, the 3D modeling system 102 can analyze the natural language phrase to identify nouns and verbs that describe or modify base nouns or base verbs. To illustrate, the 3D modeling system 102 can identify spatial nouns, counting adjectives, group nouns, and adjectival verbs and then augment the base nouns/verbs with annotations indicating the associations. FIG. 3B and the accompanying description indicate a result of pattern matching to assign non-entity/command properties of a simple natural language phrase, resulting in an entity-command representation of the natural language phrase.

Optionally, in one or more embodiments, the series of acts 200 includes an act 212 of creating a canonical entity-command representation. As briefly mentioned previously, a request to generate a particular three-dimensional scene can often take different forms in natural language phrases. In particular, the flexibility of language typically allows users to phrase requests in a variety of different ways using different words, combinations of words, and orders of words to say essentially the same thing. Because there can be different ways of forming the same request, the 3D modeling system 102 can generate a plurality of different entity-command representations corresponding to the different ways.

Figure 4C:
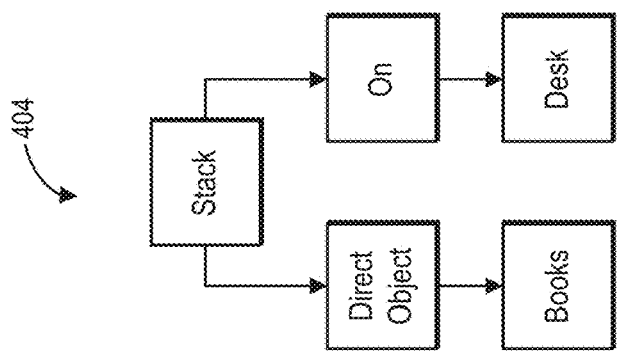
FIGS. 4A-4C illustrate diagrams of different entity-command representations for generating a three-dimensional scene in accordance with one or more implementations.
Figure 4B:
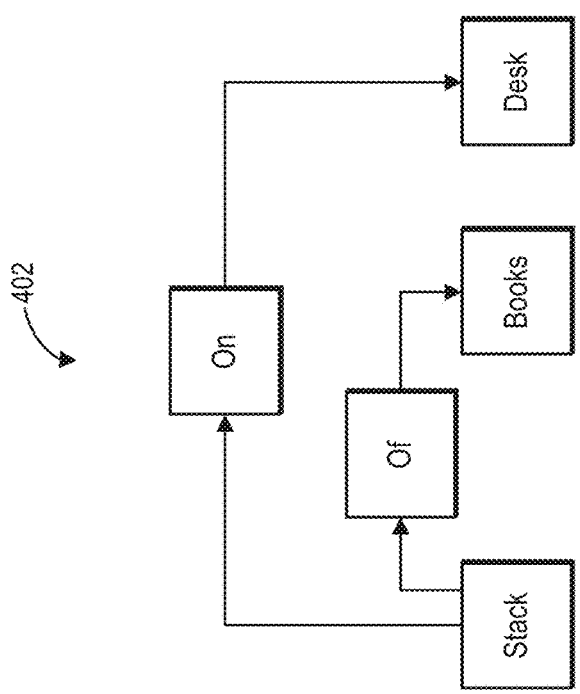
Figure 4A:
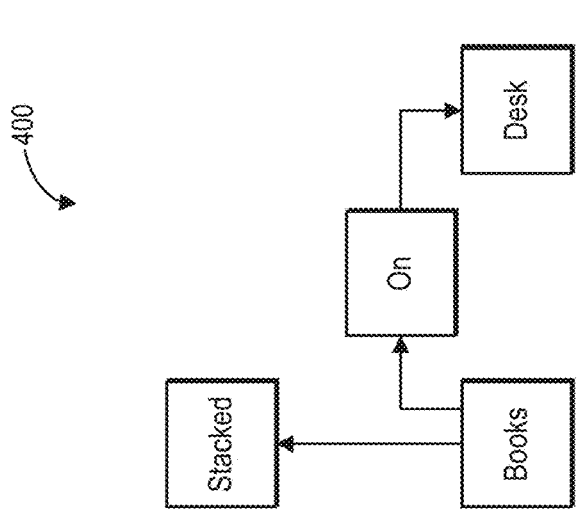

To improve consistency and reduce complexity in determining requests and generating three-dimensional scenes based on natural language phrases, the 3D modeling system 102 can determine a single entity-command representation that can be used to represent all the different forms for a conceptual request (i.e., scene editing/constructing concept). For example, the 3D modeling system 102 can determine that a specific form (e.g., descriptive form) of an entity-command representation is a canonical entity-command representation that represents the different forms of requests for generating/editing a three-dimensional scene, as described in more detail with respect to FIGS. 4A-4C. The 3D modeling system 102 can accordingly attempt to transform an entity-command representation of a natural language phrase into the canonical entity-command representation via a set of pattern matching rules.

In one or more embodiments, if a command cannot be applied as a graph transform in a an entity-command representation, the 3D modeling system leaves the command unchanged and uses specialized functions to execute the commands on the scene. For instance, for commands such as "delete" or "rotate," the 3D modeling system can use a specialized function to execute a "delete" or "rotate" function on the corresponding objects within the three-dimensional scene (e.g., after constructing a three-dimensional scene without the executed command). Alternatively, the 3D modeling system may inform the user that the command was not understood and require the user to input a new natural language phrase.

After determining an entity-command representation for the natural language phrase, the series of acts 200 includes an act 214 of converting the entity-command representation to a semantic scene graph. In particular, the 3D modeling system 102 converts the entity-command representation into a form that the 3D modeling system 102 can use to generate a three-dimensional scene. As mentioned previously, semantic scene graphs serve as a bridge between user language commands and scene modeling operations, which directly modify a three-dimensional scene. Accordingly, converting the entity-command representation into a semantic scene graph allows the 3D modeling system to easily construct a three-dimensional scene based on identified positional relationships of objects in the semantic scene graph.

In one or more embodiments, converting an entity-command representation includes determining the layout of objects within a three-dimensional scene. Specifically, the 3D modeling system 102 uses the entity-command representation to categorize base nouns in object categories, determine entity counts, entity qualifiers, and relationships. The 3D modeling system 102 then constructs the semantic scene graph to include object nodes, relationship nodes, and edges that indicate the pairwise and group-wise positioning of objects within the three-dimensional scene, as described in more detail with respect to FIG. 3C. A semantic scene graph of a natural language phrase allows the 3D modeling system 102 to determine a spatial representation of objects for generating the requested three-dimensional scene of the natural language phrase.

Finally, the series of acts 200 includes an act 216 of generating a three-dimensional scene based on the semantic scene graph. As briefly described previously, the 3D modeling system 102 can access a database including a plurality of available three-dimensional scenes (e.g., previously generated three-dimensional scenes) including a variety of objects and object layouts. The 3D modeling system 102 compares the semantic scene graph of the natural language phrase to semantic scene graphs of the available three-dimensional scenes and then selects one or more three-dimensional scenes based on how closely the semantic scene graphs match. The 3D modeling system then uses the selected three-dimensional scene(s) (or portions of the three-dimensional scenes) to generate a three-dimensional scene based on the user request.

To illustrate, the 3D modeling system 102 obtains semantic scene graphs for the available three-dimensional scenes. The 3D modeling system 102 then compares the semantic scene graph of the natural language phrase to the obtained semantic scene graphs to determine a similarity of structure of the graphs. For instance, if two semantic scene graphs match fully, the semantic scene graphs have the same node and edge label structure. Similarly, a partial match indicates that some of the nodes (or edges) of the semantic scene graphs are the same, but others are different. The 3D modeling system 102 can then rank the semantic scene graphs based on how similar the node structures are to determine one or more available three-dimensional scenes that most closely match the requested three-dimensional scene.

Figure 6:
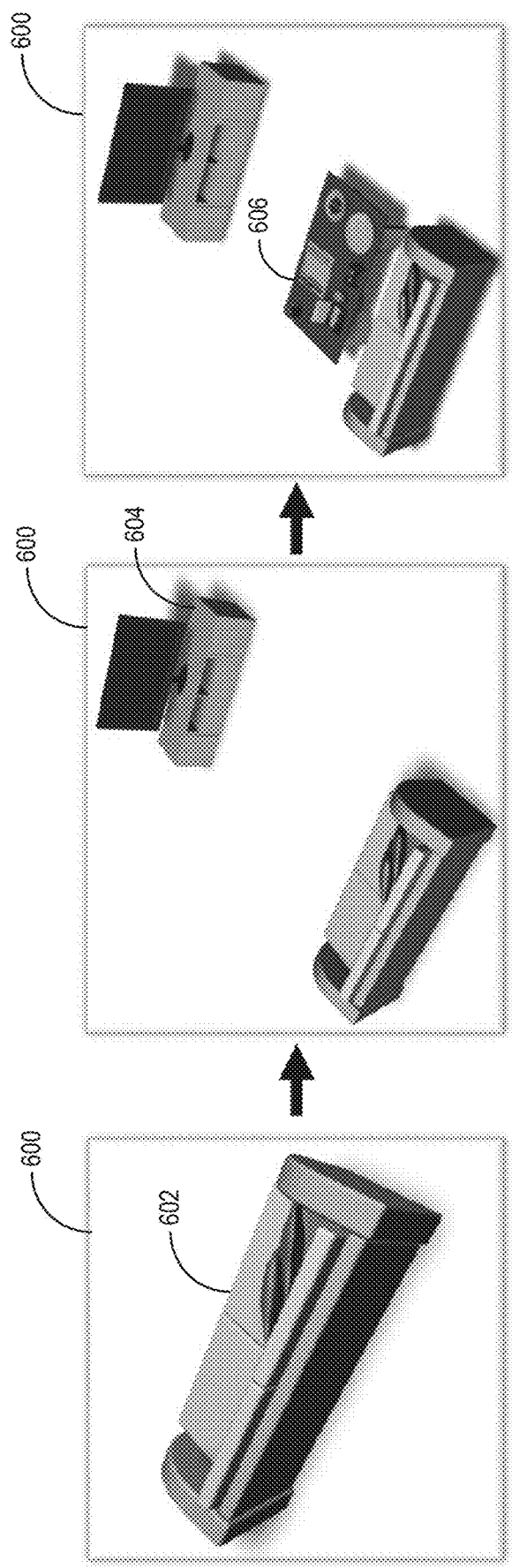
FIGS. 6A-6C illustrate embodiments of generating a three-dimensional scene from a sequence of natural language phrases in accordance with one or more implementations.

To generate the requested three-dimensional scene, the 3D modeling system 102 can use the one or more available three-dimensional scenes that most closely match the requested three-dimensional scene. For example, the 3D modeling system can extract one or more objects from the available three-dimensional scene and then places the one or more objects into a three-dimensional environment at a client device of the user. To illustrate, the 3D modeling system 102 can place the object(s) at coordinates that reflect the relative positions of the objects on a set of coordinate axes. For instance, if the user is modifying an existing scene, the 3D modeling system 102 can insert the objects into the existing scene, as described in more detail in relation to FIGS. 6A-6C. Alternatively, the 3D modeling system 102 can cause the user client device to directly load a file containing the existing three-dimensional scene into a new project workspace.

As described in relation to FIG. 2 and in the corresponding FIGS. 3A-5C, the 3D modeling system 102 can perform operations for processing natural language phrases to create entity-command representations (and corresponding semantic scene graphs) of the natural language phrases. The operations allow the 3D modeling system to receive natural language requests to generate new three-dimensional scenes and/or modify existing three-dimensional scenes using existing scenes. Accordingly, the acts and operations illustrated and described above in relation to FIG. 2 and below in relation to FIGS. 3A-6C provide the corresponding structure for an example step for using natural language processing to generate an entity-command representation of dependencies involving one or more entities and one or more commands of the natural language phrase.

Figure 3A:
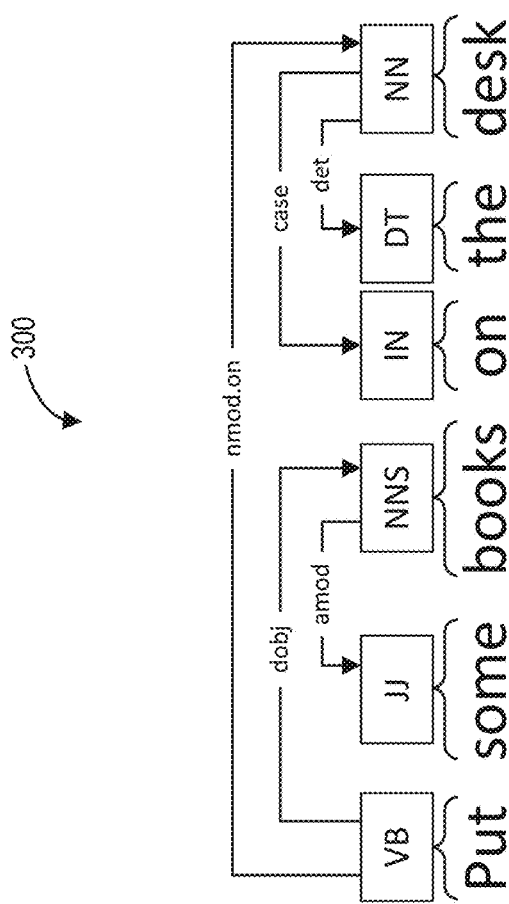

FIG. 3A illustrates a dependency tree 300 that the 3D modeling system 102 generates for a natural language phrase. Specifically, FIG. 3A illustrates a natural language phrase that reads "Put some books on the desk." The dependency tree illustrates dependencies (including dependency/relationship types) involving the different phrase components in the natural language phrase. The dependency tree provides a consistent lexical structure that the 3D modeling system can use to identify different words in a phrase.

In one or more embodiments, the 3D modeling system 102 identifies a plurality of tokens in the natural language phrase corresponding to a plurality of character strings the have identified meanings. As constructed, the natural language phrase includes a request for the 3D modeling system to place some books on a desk within a three-dimensional modeling environment. The 3D modeling system 102 first identifies each character string that has an identified meaning such that, in this case, the 3D modeling system 102 identifies every character string in the natural language phrase as a token.

After identifying the tokens in the natural language phrase, the 3D modeling system 102 annotates each token with a label indicating the specific component of speech to which the token belongs. For instance, the 3D modeling system 102 can identify and label nouns (including whether the nouns are plural), verbs, adjectives, prepositions, and determiners of the natural language phrase. As illustrated in FIG. 3A, the 3D modeling system 102 determines that "Put" is a verb, "some" is an adjective, "books" is a plural noun, "on" is a preposition, "the" is a determiner, and "desk" is a singular noun. Accordingly, the 3D modeling system 102 has identified and labeled each word in the phrase with its corresponding token type/category.

Furthermore, when generating the dependency tree, the 3D modeling system 102 also determines the dependencies of the various tokens in the context of the natural language phrase. In particular, each dependency indicates a relationship involving a token and one or more other tokens of the natural language phrase. To illustrate, FIG. 3A shows that the 3D modeling system identifies the verb token "Put" as acting on the direct object "books" as a nominal modifier to place the direct object on the prepositional noun "table" in accordance with the identified preposition "on." Furthermore, the 3D modeling system 102 determines that "some" is an adjective the modifies "books" to indicate placing some number of books on the table. The 3D modeling system 102 also determines that "the" is a determiner of "table." By identifying and labeling the components and their relationships, the 3D modeling system generates a tree with the verb "Put" as the structural center (e.g., root node) of the tree.

The 3D modeling system 102 thus utilizes a natural language processor to determine the labels for any nouns, verbs, and attributes in the natural language phrase. For more complex sentences, the 3D modeling system 102 can generate larger dependency trees with more branches based on the corresponding relationships and the number of nouns, verbs, modifiers, and prepositions. As an example, the phrase "In the center of the table is a flower vase" includes a plurality of nouns that the 3D modeling system 102 identifies and labels, some of which are base nouns and some of which are compound nouns, etc. While the structure of the phrase is more complex than the embodiment of FIG. 3A, the 3D modeling system is able to create an accurate dependency tree for the phrase with "is" as the structural center.

Once the 3D modeling system 102 has created the dependency tree for a natural language phrase, the 3D modeling system 102 can then generate an entity-command representation for the natural language phrase. FIG. 3B illustrates an entity-command representation 302 of the natural language phrase of FIG. 3A. In particular, the 3D modeling system 102 generates the entity-command representation 302 based on the identified components and dependencies in the dependency tree 300 for the natural language phrase.

In one or more embodiments, the 3D modeling system 102 generates the entity-command representation by defining a set of entities and a set of commands for the natural language phrase based on the dependency tree. In particular, an entity includes a category of the base noun and is associated with any attributes of the base noun, a count of the noun, relationships connecting the noun to another entity within the sentence, and any determiners corresponding to the noun. An entity category includes the base noun used to describe an object in the three-dimensional scene (e.g., "table," "plate," "arrangement"). As mentioned, base nouns includes that are not in a compound dependency relationship with another noun, are not abstract concepts, and do not represent spatial regions. An attribute of a base noun includes one or more modifier words to modify the base noun (e.g., "modern," "blue (very, dark)"). A count of the noun includes either an integer representing the number of entities in a group or a qualitative descriptor (e.g., "2," "three," "many," "some"). A relationship connecting the noun to another entity includes a set of (string, entity) pairs that describe a connection to another specific entity in the sentence (e.g., "on:desk," "left-of:keyboard"). A determiner corresponding to a noun includes a word, phrase, or affix that expresses the reference of the noun in the context (e.g., "a," "the," "another," "each").

Additionally, a command includes a base verb and is associated with any attributes for the verb and any targets of the verb. To illustrate, a base verb includes a verb used to describe the command (e.g., "move," "rearrange"). An attribute of a verb includes a set of one or more modifier words that help modify the verb/command (e.g., "closer," "dirty (more)"). A target of a verb is a list of (string, entity) pairs that represent different types of connections to specific entities (e.g., "direct object:laptop," "onto:table").

As illustrated in FIG. 3B, the 3D modeling system 102 converts the dependency tree 300 of FIG. 3A into the entity-command representation 302 by placing the identified entities and commands in a logical configuration that connects the entities and commands based on the determined dependencies from the dependency tree 300. For instance, to convert the phrase, "Put some books on the desk," into an entity-command representation, the 3D modeling system 102 identifies two separate entities—a first entity 304a ("books") and a second entity 304b ("desk").

In one or more embodiments, the 3D modeling system 102 uses pattern matching to determine and assign the other properties of the natural language phrase to the corresponding entity or command in the entity-command representation 302. For example, the 3D modeling system 102 determines that amod (noun:A, adjective:B) assigns token B as either an attribute or a count of the entity seeded at A, if one exists. When pattern matching, the 3D modeling system 102 augments the standard parts of speech used by the natural language processor to create the dependency tree 300 with four classes used for scene understanding. A first class includes spatial nouns, which are spatial regions relative to entities (e.g., "right," "center," "side"). A second class includes counting adjectives, which are adjectives representing object count or general qualifiers (e.g., "all," "many"). A third class includes group nouns that embody special meaning over a collection of objects (e.g., "stack," "arrangement"). A fourth class includes adjectival verbs, which the 3D modeling system 102 can model as an attribute modification over the direct object (e.g., "clean," "brighten").

To illustrate, the 3D modeling system 102 identifies associated components of the phrase that correspond to each of the entities. Specifically, when constructing the entity-command representation 302, the 3D modeling system 102 determines that "some" is a counting adjective that modifies the first entity 304a and creates a block 306 corresponding to "some" that is connected to the first entity 304a. Additionally, the 3D modeling system 102 determines that "the" is a determiner corresponding to the second entity 304b and creates a block 308 corresponding to "the" that is connected to the second entity 304b.

In addition to connecting the appropriate blocks to the entities, the 3D modeling system 102 connects entities to command(s) within the entity-command representation 302. In particular, the 3D modeling system 102 first determines that "put" is a command 310 within the phrase. The 3D modeling system 102 then determines that the first entity 304a is a target (i.e., a direct object) of the command 310 and creates a block 312 to indicate the target relationship between the first entity 304a and the command 310. The 3D modeling system 102 also determines that the second entity 304b has a relationship with the command 310 and the first entity 304a via a preposition (i.e., "on") and creates a block 314 connecting the second entity 304b to the command 310. Accordingly, the 3D modeling system 102 connects the first entity 304a and the second entity 304b via the determined relationships and the command 310.

While FIG. 3B illustrates an entity-command representation 302 for the phrase of FIG. 3A, the 3D modeling system 102 can generate entity-command representations for more complex phrases involving any number of nouns and commands. For instance, a natural language phrase can include a plurality of requests. The 3D modeling system 102 can parse the natural language phrase to determine each separate request and then generate separate entity-command representations for each request. To illustrate, for a natural language phrase that states, "Move the chairs around the dining table farther apart and transfer some of the books on the desk to a table," the 3D modeling system 102 can determine that the natural language phrase includes a first request to move the chairs around the table farther apart and a second request to transfer some books from a desk to a table.

Additionally, as mentioned previously, the 3D modeling system 102 can use co-referencing information to dereference pronouns. This means that the 3D modeling system 102 does not create new entities for pronouns, but instead determines a corresponding noun and then applies any attributes, relationships, etc. to the corresponding noun, rather than to a new entity. For example, in the phrase, "Add a dining room table and put plates on top of it," the 3D modeling system determines that "it" corresponds to the dining room table.

In one or more embodiments, the 3D modeling system 102 determines that there is ambiguity in a non-pronoun scenario (e.g., two nouns with the same name or meaning), however, the 3D modeling system 102 can resolve the ambiguity when aligning entities to objects in the three-dimensional scene. For instance, in the phrase mentioned above requesting to transfer books from a desk to a table, "a table" may refer to the table in the first request to move the chairs farther apart, or "a table" may refer to a different table in the same scene. Accordingly, the 3D modeling system 102 can create a new entity for "a table" (e.g., in a separate entity-command representation). The 3D modeling system 102 will then attempt to resolve the ambiguity when constructing or modifying the requested three-dimensional scene by determining whether the scene includes one table or more than one table.

Figure 3C:
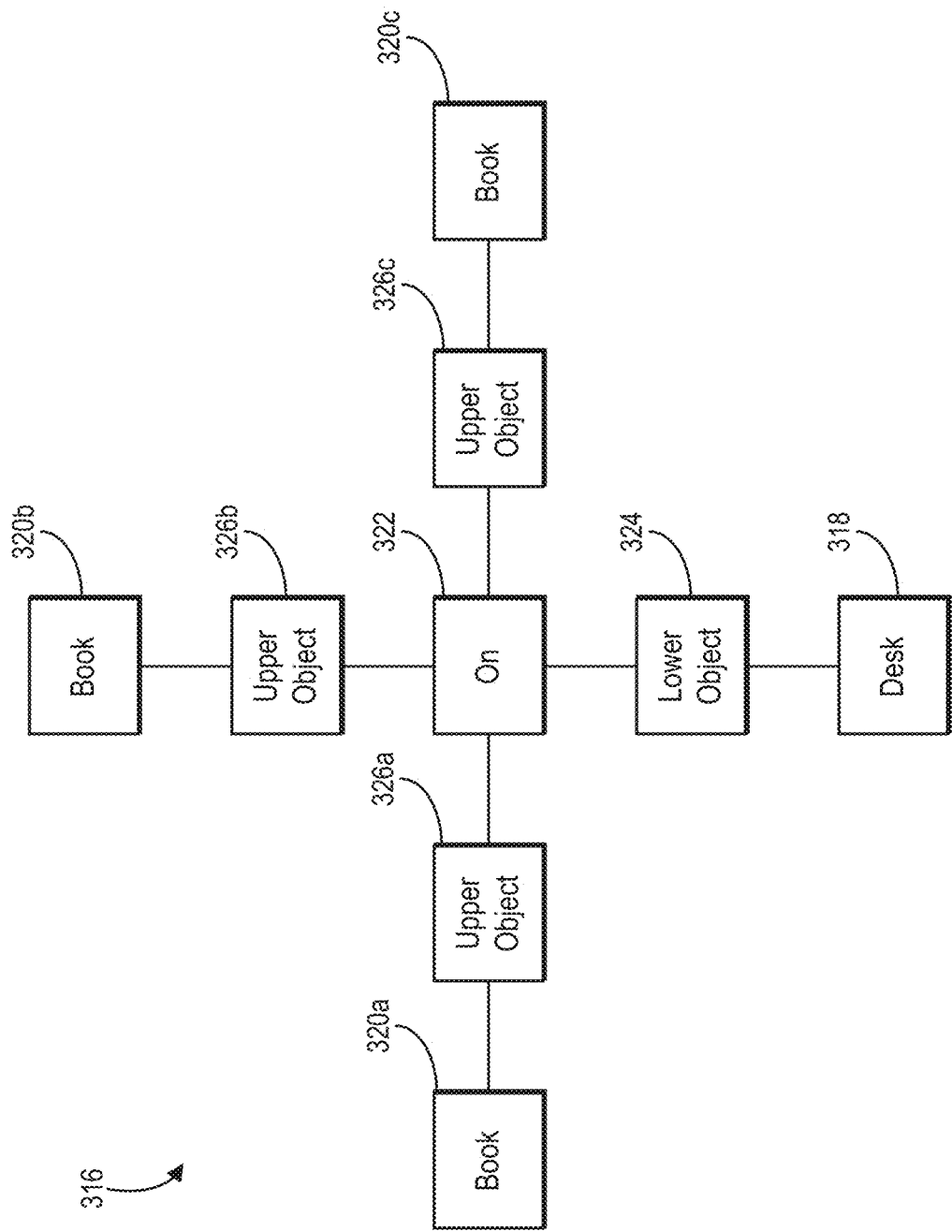

After generating the entity-command representation 302, the 3D modeling system 102 generates a semantic scene graph 316 corresponding to the entity-command representation 302, as illustrated in FIG. 3C. In one or more embodiments, the 3D modeling system 102 generates the semantic scene graph 316 to create a representation that the 3D modeling system 102 can use to easily identify a previously generated three-dimensional scene that most closely corresponds to the requested three-dimensional scene. As described below, the semantic scene graph 316 includes a plurality of nodes and edges that indicate spatial relationships between objects in a three-dimensional scene.

Specifically, a semantic scene graph is an undirected graph that includes object nodes, relationship nodes, and edge labels. Object nodes represent objects in a three-dimensional scene. The 3D modeling system 102 can annotate the objects in the scene with a list of per-object attributes (e.g., "antique," "wooden"). Relationship nodes represent a specific instance of a relationship between two or more objects (e.g., "to the left of," "on each side of" "around," "on top of"). Furthermore, each edge label connects an object node to a relationship node and describes the type of connection between the corresponding object and relationship. Each of these components are described in more detail below.

In one or more embodiments, the 3D modeling system 102 generates the semantic scene graph 316 by first assigning each base noun to an object category. Specifically, the 3D modeling system 102 can use a model database with a fixed set of object categories to map the base noun for each entity into a corresponding object category and create an object node for the base noun. For instance, the 3D modeling system 102 can use equivalence sets derived from Princeton WordNet. The 3D modeling system 102 discards entities that do not map to a category in the model database. Additionally, the 3D modeling system 102 adds attributes and determiners as annotations to the corresponding object nodes.

For the phrase illustrated in FIGS. 3A-3B, the 3D modeling system 102 generates object nodes for each of the identified entities. Specifically, the 3D modeling system 102 uses entity count information from the entity-command representation 302 to instantiate a new object node for each object instance. For integer counts, 3D modeling system 102 can simply generate a number of object nodes that correspond to the integer count. To illustrate, an integer count of "three" causes the 3D modeling system 102 to create three separate object nodes for the entity.

For imprecise counts such as "some" and "many," the 3D modeling system 102 can obtain a frequency histogram for each object category by examining the available three-dimensional scenes (e.g., in the content database 106 of FIG. 1) and counting the number of occurrences of two or more instances of the category. For each counting modifier, the 3D modeling system 102 can use this distribution to obtain lower and upper bounds on the count implied by the modifier-category pair and then sample uniformly from this distribution. For instance, the 3D modeling system 102 can sample between the 0th and 2th percentiles for "few," between the 10th and 50th percentiles for "some," and between the 50th and 100th percentiles for "many." The 3D modeling system 102 can infer that plural nouns without a modifier (e.g., "There are chairs around the table") as having an implied "some" modifier. The 3D modeling system 102 duplicates relationships, attributes, and determiners across each new instance of an object.

Furthermore, the 3D modeling system 102 identifies any qualifiers in the entity-command representation to determine the presence of a plurality of object nodes. For example, qualifiers such as "each" and "all" imply the presents of more than one object node for a specific entity. In one or more embodiments, the 3D modeling system 102 leaves the qualifiers over a single object node until the 3D modeling system 102 uses the semantic scene graph 316 to generate the three-dimensional scene.

The 3D modeling system 102 also transfers relationship information from the entity-command representation 302 into relationship nodes in the semantic scene graph 316. In particular, the 3D modeling system 102 can generate relationship nodes for each of the objects based on relationships in the entity-command representation 302 based on prepositions or other relationship information. To illustrate, the 3D modeling system 102 can insert relationship nodes that indicate whether an object is "on top of," "left of," "under," "in front of," etc., another object within the scene. Relationships that support more than one object are grouped together into a single relationship node within the semantic scene graph 316.

To illustrate, FIG. 3C shows a plurality of object nodes connected by a single relationship node for the entity-command representation 302 of FIG. 3B. Specifically, the semantic scene graph 316 includes a first object node 318 representing the second entity 304b from the entity-command representation (corresponding to the "desk" object). Additionally, the semantic scene graph 316 includes a plurality of object nodes 320a-320c representing the first entity 304a from the entity-command representation (corresponding to the "books" object). The semantic scene graph 316 includes a relationship node 322 that indicates that the corresponding objects of the object nodes 320a-320c are "on" the corresponding object of the object node 318. Additionally, as illustrated, because all of the books share the same relationship with the desk, the 3D modeling system 102 includes only one relationship node 322 in the semantic scene graph 316.

As previously described, the 3D modeling system 102 determines a count for each entity from the entity-command representation 302. FIG. 3C illustrates that the 3D modeling system 102 inferred a count of objects based on the "books" entity (the first entity 304a in the entity-command representation 302). In particular, the 3D modeling system 102 analyzes the available scenes from a content database to determine a range of possible counts for the imprecise count "some." In the present embodiment, the 3D modeling system 102 determines that "some" includes three book objects by uniformly sampling on the 10th to 50th percentiles of a frequency histogram of the available scenes. Accordingly, the 3D modeling system 102 generates three separate object nodes for the entity.

In addition to the object nodes and the relationship nodes, the semantic scene graph 316 includes a plurality of edges that describe the relationship between each object node via the relationship node. Specifically, edges indicate a directionality of a relationship between two object nodes from the entity-command representation 302. For instance, the semantic scene graph 316 includes a first edge 324 representing information indicating that the desk is a lower object relative to one or more other objects. The semantic scene graph 316 also includes a plurality of edges 326a-326c representing information that the books are upper objects relative to one or more other objects. Because the relationship node 322 indicates a relationship of "on," the combination of the first edge 324 and the plurality of edges 326a-326c with the relationship node 322 and object nodes 318, 320a-320c indicate to the 3D modeling system 102 that the books are on top of the desk within the three-dimensional scene.

In one or more embodiments, prior to generating a semantic scene graph for a natural language phrase, the 3D modeling system 102 first determines a canonical entity-command representation. As briefly described previously, a single conceptual request to generate a specific three-dimensional scene can be phrased in a number of different ways. To illustrate, to generate a three-dimensional scene with books on top of a desk, a user can say a first phrase, "There are books stacked on the desk," a second phrase, "There is a stack of books on the desk," or a third phrase, "Stack books on the desk." Each phrase includes a unique syntax with different nouns, verbs, prepositions, etc., resulting in different entity-command representations, as illustrated by the entity-command representations 400-404 in FIGS. 4A-4C. Specifically, a first entity-command representation 400 corresponds to the first phrase above, a second entity-command representation 402 corresponds to the second phrase above, and a third entity-command representation 404 corresponds to the third phrase above.

To create a consistent form of entity-command representations, the 3D modeling system 102 can select a specific form of entity-command representation as a canonical representation. In particular, the canonical representation allows the 3D modeling system 102 to determine a single entity-command representation to generate for every form of a conceptual request. In one or more embodiments, the 3D modeling system 102 selects the descriptive form of entity-command representation (the first entity-command representation 400) as the canonical representation, if possible. As described herein, a descriptive form of an entity-command representation is a representation in which base nouns are objects that have sets of attributes that describe the base nouns. If a user inputs a request that uses a different form, the 3D modeling system 102 uses a set of pattern matching rules (e.g., similar to pattern matching rules for generating an entity-command representation) to transform the resulting entity-command representation into the descriptive form.

In response to generating a semantic scene graph for a natural language phrase, the 3D modeling system 102 generates a three-dimensional scene using the semantic scene graph. In one or more embodiments, the 3D modeling system 102 identifies one or more available scenes that most closely resemble the requested scene from the natural language phrase. For example, the 3D modeling system 102 compares the semantic scene graph to semantic scene graphs for a plurality of available three-dimensional scenes to identify one or more scenes that are similar to the requested scene. To illustrate, the 3D modeling system 102 can compare the semantic scene graph of the natural language phrase to each semantic scene graph of the available scenes by comparing the object nodes, relationship nodes, and edges of the semantic scene graph of the natural language phrase with the object nodes, relationship nodes, and edges of the semantic scene graph of the available scene. A higher number of overlapping nodes and edges indicates a closer match, while a lower number of overlapping nodes and edges indicates less of a match.

Additionally, the 3D modeling system 102 can rank the available scenes by determining how closely the respective semantic scene graphs match the semantic scene graph of the natural language phrase. For instance, the 3D modeling system 102 can assign a comparison score to each semantic scene graph of the available three-dimensional scenes based on the number and similarity of nodes and edges with the semantic scene graph of the natural language phrase. The 3D modeling system 102 can then use the comparison scores to generate a ranked list of scenes with higher comparison scores being higher on the ranked list of scenes. The 3D modeling system 102 may also use a threshold score to determine whether any of the available scenes closely align with the natural language phrase.

FIG. 5 illustrates a plurality of available three-dimensional scenes from a content database identified based on the semantic scene graph 316 of FIG. 3C. Specifically, a first scene 500 includes a table with a single book on top of the table. A second scene 502 includes a desk with six books on top of the desk. A third scene 504 includes a bookcase with three books on a shelf within the bookcase. The 3D modeling system 102 compares the semantic scene graph 316 to the semantic scene graphs of each scene and then selects at least one scene that most closely match the intended request of the natural language phrase.

The 3D modeling system 102 selects the second scene 502 for use in generating the three-dimensional scene of the natural language phrase. The 3D modeling system selects the second scene 502 because the second scene 502 is most similar to the semantic scene graph 316 (i.e., the second scene 502 includes a desk with books on top of the desk). In particular, even though the second scene 502 has some differences based on the semantic scene graph of the second scene 502 (i.e., six books instead of three books as in the semantic scene graph 316), the second scene 502 is still closer to the requested scene than other available scenes (e.g., books on a desk, rather than books on a table or in a bookcase). Furthermore, because the requested scene included an imprecise count ("some") with reference to the books entity, the 3D modeling system 102 can determine that the second scene 502 is an acceptable deviation from the semantic scene graph 316. Additionally, the 3D modeling system 102 may require certain entities, commands, and/or other properties to be shared for a scene to be a close match.

As briefly mentioned previously, the 3D modeling system 102 can generate the three-dimensional scene for the natural language phrase using an available three-dimensional scene by inserting objects of the selected, available three-dimensional scene (or from a plurality of available three-dimensional scenes) into a workspace of the user. Specifically, the 3D modeling system 102 can select an object in the available three-dimensional scene based on an object identifier that corresponds to the object. The 3D modeling system 102 can then copy the object, along with one or more properties of the object, and paste/duplicate the object in the user's workspace. The 3D modeling system 102 can perform copy-paste operations for a plurality of objects in a selected, available three-dimensional scene until the 3D modeling system 102 determines that the requested three-dimensional scene is complete. To illustrate, the 3D modeling system 102 can copy the desk and books of the second scene 502 of FIG. 4 and paste the copied objects into a user workspace at a client device of the user.

In alternative embodiments, the 3D modeling system 102 presents the selected three-dimensional scene to the user to allow the user to insert the objects into a workspace. For example, the 3D modeling system 102 can cause the client device of the user to open a new workspace within a client application. The user can then select one or more of the objects in the client application and move the objects into a previously existing workspace or leave the objects in the new workspace to start a new project.

In one or more embodiments, the 3D modeling system 102 allows a user to augment an existing three-dimensional scene using natural language requests. FIGS. 6A-6C illustrate a plurality of three-dimensional scenes generated in succession using natural language phrases. As shown in FIG. 6A, the 3D modeling system 102 generates a three-dimensional scene 600 including a first set of objects 602. In particular, the 3D modeling system 102 identifies a first natural language phrase including a request to generate the three-dimensional scene 600 to include one or more objects. The 3D modeling system 102 parses the first natural language phrase to generate a semantic scene graph of the first phrase and then selects one or more available three-dimensional scenes including the first set of objects 602 using the semantic scene graph to generate the three-dimensional scene 600.

Additionally, the 3D modeling system 102 identifies a second natural language phrase including a request to augment the three-dimensional scene 600 with a second set of objects 604. The 3D modeling system 102 parses the second natural language phrase to create a semantic scene graph representing the second phrase. The 3D modeling system 102 selects one or more available three-dimensional scenes including the second set of objects 604 using the semantic scene graph of the second phrase. The 3D modeling system then augments the three-dimensional scene 600 by inserting the second set of objects 604 into the three-dimensional scene, as illustrated in FIG. 6B.

FIG. 6C illustrates a third set of objects 606 inserted into the three-dimensional scene 600. Specifically, the 3D modeling system 102 identifies a request to further augment the three-dimensional scene 600 in a third natural language phrase. The 3D modeling system 102 parses the third natural language phrase to create a corresponding semantic scene graph and then selects one or more available three-dimensional scenes including the third set of objects 606 using the semantic scene graph of the third phrase. Finally, the 3D modeling system 102 augments the three-dimensional scene 600 by inserting the third set of objects 606 into the three-dimensional scene 600.

As shown in the example of FIGS. 6A-6C, the 3D modeling system 102 can augment a three-dimensional scene by inserting additional three-dimensional objects into the scene at specific positions within the scene. In one or more embodiments, the 3D modeling system 102 determines the locations of the new objects based on information contained within the natural language phrases. For instance, the 3D modeling system 102 can insert a coffee table in between a sofa and a television in response to natural language phrases that state, "Insert a sofa," "Put a TV in front of the sofa," and "Put a coffee table between the sofa and the TV." The 3D modeling system 102 can use additional intelligence to determine the locations of the objects within the scene and can adjust the positions of objects already in the scene to fit new objects, if necessary.

Figure 7:
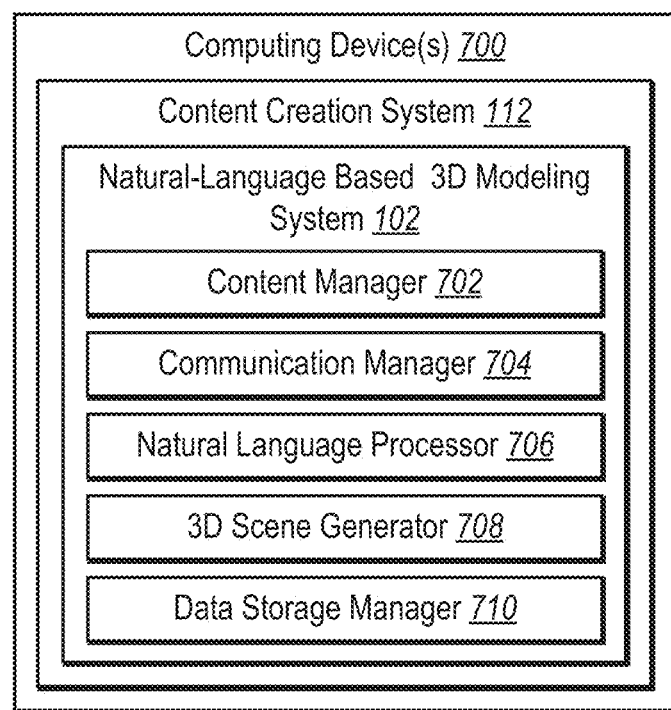
FIG. 7 illustrates a diagram of the three-dimensional 3D modeling system of FIG. 1 in accordance with one or more implementations.

As described in relation to FIGS. 1-6C, the 3D system 102 can thus perform operations for processing natural language phrases to generate three-dimensional scenes. FIG. 7 illustrates a detailed schematic diagram of an embodiment of the 3D system 102 described above. As shown, the 3D modeling system 102 can be implemented within a content creation system 112 on computing device(s) 700 (e.g., a client device and/or server device as described in FIG. 1 and as further described below in relation to FIG. 9). Additionally, the 3D modeling system 102 can include, but is not limited to, a content manager 702, a communication manager 704, a natural language processor 706, a 3D scene generator 708, and a data storage manager 710. The 3D modeling system 102 can be implemented on any number of computing devices. For example, the 3D modeling system 102 can be implemented in a distributed system of server devices for generating three-dimensional scenes based on natural language phrases. Alternatively, the 3D modeling system 102 can be implemented on a single computing device such as a single client device running a client application that processes natural language for generating three-dimensional scenes.

In one or more embodiments, each of the components of the 3D modeling system 102 is in communication with other components using any suitable communication technologies. Additionally, the components of the 3D modeling system 102 can be in communication with one or more other devices including other computing devices of a user, server devices (e.g., cloud storage devices), licensing servers, or other devices/systems. It will be recognized that although the components of the 3D modeling system 102 are shown to be separate in FIG. 7, any of the subcomponents may be combined into fewer components, such as into a single component, or divided into more components as may serve a particular implementation. Furthermore, although the components of FIG. 7 are described in connection with the 3D modeling system 102, at least some of the components for performing operations in conjunction with the 3D modeling system 102 described herein may be implemented on other devices within the environment.

The components of the 3D modeling system 102 can include software, hardware, or both. For example, the components of the 3D modeling system 102 can include one or more instructions stored on a computer-readable storage medium and executable by processors of one or more computing devices (e.g., the computing device(s) 700). When executed by the one or more processors, the computer-executable instructions of the 3D modeling system 102 can cause the computing device(s) 700 to perform the three-dimensional generation operations described herein. Alternatively, the components of the 3D modeling system 102 can include hardware, such as a special purpose processing device to perform a certain function or group of functions. Additionally, or alternatively, the components of the 3D modeling system 102 can include a combination of computer-executable instructions and hardware.

Furthermore, the components of the 3D modeling system 102 performing the functions described herein with respect to the 3D modeling system 102 may, for example, be implemented as part of a stand-alone application, as a module of an application, as a plug-in for applications including marketing applications, as a library function or functions that may be called by other applications, and/or as a cloud-computing model. Thus, the components of the 3D modeling system 102 may be implemented as part of a stand-alone application on a personal computing device or a mobile device. Alternatively, or additionally, the components of the 3D modeling system 102 may be implemented in any application that allows three-dimensional content generation, including, but not limited to ADOBE® CREATIVE CLOUD®, ADOBE® FUSE, ADOBE® DIMENSION®, and ADOBE® ILLUSTRATOR® software. "ADOBE," "ADOBE FUSE," "CREATIVE CLOUD," "ADOBE FUSE," "ADOBE DIMENSION," and "ILLUSTRATOR" are registered trademarks of Adobe Inc. in the United States and/or other countries.

As mentioned, the 3D modeling system 102 includes a content manager 702 that facilitates the storage and management of three-dimensional content. Specifically, the content manager 702 can access a content database (e.g., content database 106 of FIG. 1), which includes a plurality of three-dimensional scenes that any number of content creators have previously created. The content manager 702 allows content creators to store and share three-dimensional content across applications and devices and/or with other users. Furthermore, the content manager 702 can store and/or manage assets for generating three-dimensional scenes.

The 3D modeling system 102 includes a communication manager 704 that facilitates communication between the 3D modeling system 102 and one or more computing devices and/or systems. For example, the communication manager 704 can facilitate communication with one or more client devices of users to receive natural language requests to generate three-dimensional scenes. Additionally, the communication manager 704 can facilitate communication with client devices to provide three-dimensional scenes generated in response to the natural language requests. Furthermore, the communication manager 704 can allow the client devices to store three-dimensional scenes on the content manager 702 for later use by one or more users.

The 3D modeling system 102 also includes a natural language processor 706 to facilitate processing and analysis of natural language phrases. Specifically, the natural language processor 706 can use natural language processing techniques to generate dependency trees, entity-command representations, and semantic scene graphs of natural language phrases. The natural language processor 706 can also communicate with one or more other components (e.g., the 3D scene generator) to provide the semantic scene graphs for comparing to available three-dimensional scenes in the content manager 702.

The 3D modeling system 102 also includes a 3D scene generator 708 to facilitate the generation of three-dimensional scenes. In particular, the 3D scene generator 708 can use a semantic scene graph of a natural language phrase from the natural language processor 706 to identify one or more available three-dimensional scenes that the 3D scene generator can use in generating a three-dimensional scene based on the natural language phrase. The 3D scene generator 708 can also perform operations within a three-dimensional environment to insert, remove, manipulate, or otherwise modify three-dimensional content in a three-dimensional content scene.

The 3D modeling system 102 also includes a data storage manager 710 (that comprises a non-transitory computer memory) that stores and maintains data associated with processing natural language phrases and generating three-dimensional scenes. For example, the data storage manager 710 can store semantic scene graphs for natural language phrases and three-dimensional scenes. The data storage manager 710 can also store information for accessing and searching a content database in conjunction with the content manager 702.

Figure 8:
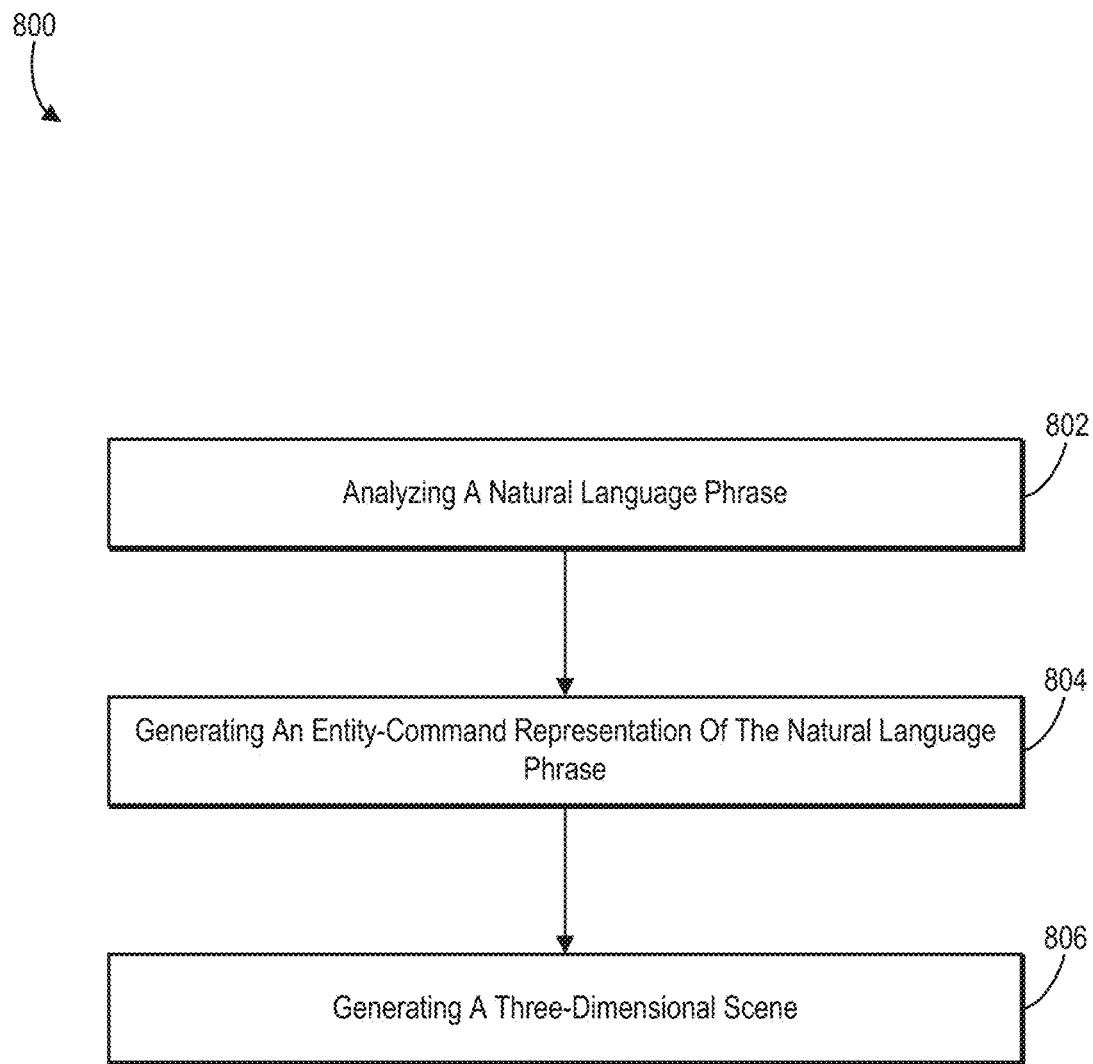
FIG. 8 illustrates a flowchart of a series of acts for synthesizing three-dimensional scenes using natural language in accordance with one or more implementations.

Turning now to FIG. 8, this figure shows a flowchart of a series of acts 800 of synthesizing three-dimensional scenes using natural language. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

As shown, the series of acts 800 includes an act 802 of analyzing a natural language phrase. For example, act 802 involves analyzing, using natural language processing, a natural language phrase comprising a request to generate a three-dimensional scene to determine dependencies involving one or more entities and one or more commands of the natural language phrase. Act 802 can involve receiving a text input including the natural language phrase or a voice input including the natural language phrase. Additionally, a natural language phrase can include a plurality of requests to generate a plurality of three-dimensional scenes. Act 802 can also involve receiving a plurality of natural language phrases.

The series of acts 800 also includes an act 804 of generating an entity-command representation of the natural language phrase. For example, act 804 involves generating an entity-command representation of the natural language phrase using the determined dependencies between the one or more entities and the one or more commands. For instance, act 804 can first involve generating a dependency tree comprising a plurality of tokens representing words in the natural language phrase and dependency relationships corresponding to the plurality of tokens. Act 804 can then involve converting the dependency tree into: an entity list comprising one or more entities annotated with one or more attributes and one or more relationships corresponding to the one or more entities; and a command list comprising one or more command verbs operating over the one or more entities.

Act 804 can also involve identifying one or more additional natural language phrases comprising requests to generate the three-dimensional scene in one or more different phrase forms. Act 804 can further involve generating a canonical entity-command representation for the one or more different phrase forms of the one or more additional natural language phrases.

Act 804 can also involve determining that the object node comprises an imprecise count corresponding to the base noun. Act 804 can then involve determining a frequency histogram for the object category by analyzing a scene database to count a number of occurrences of two or more instances of entities in the object category. Act 804 can further involve determining a number of objects to include in the three-dimensional scene for the entity by sampling a distribution for a counting modifier of the entity-command representation, the distribution determined based on the frequency histogram. For example, act 804 can involve determining a number of object nodes to include in the semantic scene graph for the base noun by sampling a distribution determined based on the frequency histogram.

Additionally, the series of acts 800 includes an act 806 of generating a three-dimensional scene. For example, act 806 involves generating the three-dimensional scene by using at least one three-dimensional scene of a plurality of available three-dimensional scenes identified based on the entity-command representation of the natural language phrase. For instance, act 806 can involve accessing a database comprising previously generated three-dimensional scenes having corresponding semantic scene graphs representing layouts of objects within the previously generated three-dimensional scenes.

Act 806 can also involve converting the entity-command representation of the natural language phrase to a semantic scene graph indicating contextual relationships of the one or more entities and the one or more commands. For example, act 806 can involve mapping a base noun for an entity of the one or more entities into an object node of an object category. Act 806 can also involve mapping a relationship corresponding to the one or more entities to a relationship node with an edge indicating a direction of the relationship corresponding to the one or more entities. Act 806 can involve generating an edge indicating a direction of the relationship corresponding to the one or more entities.

Act 806 can also involve adding an attribute or a determiner as an annotation to the object node of the base noun. Furthermore, act 806 can involve using the semantic scene graph to select a three-dimensional scene from the plurality of available three-dimensional scenes corresponding to the semantic scene graph.

Additionally, act 806 can involve comparing the semantic scene graph of the natural language phrase to semantic scene graphs of the plurality of available three-dimensional scenes. For example, act 806 can involve ranking the plurality of available three-dimensional scenes based on a similarity of the semantic scene graph of the natural language phrase and semantic scene graphs of the plurality of available three-dimensional scenes. Act 806 can also involve identifying, from the plurality of available three-dimensional scenes, a three-dimensional scene that has a semantic scene graph matching the semantic scene graph of the natural language phrase. For example, act 806 can involve selecting, from the plurality of available three-dimensional scenes, a three-dimensional scene that has a highest rank.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
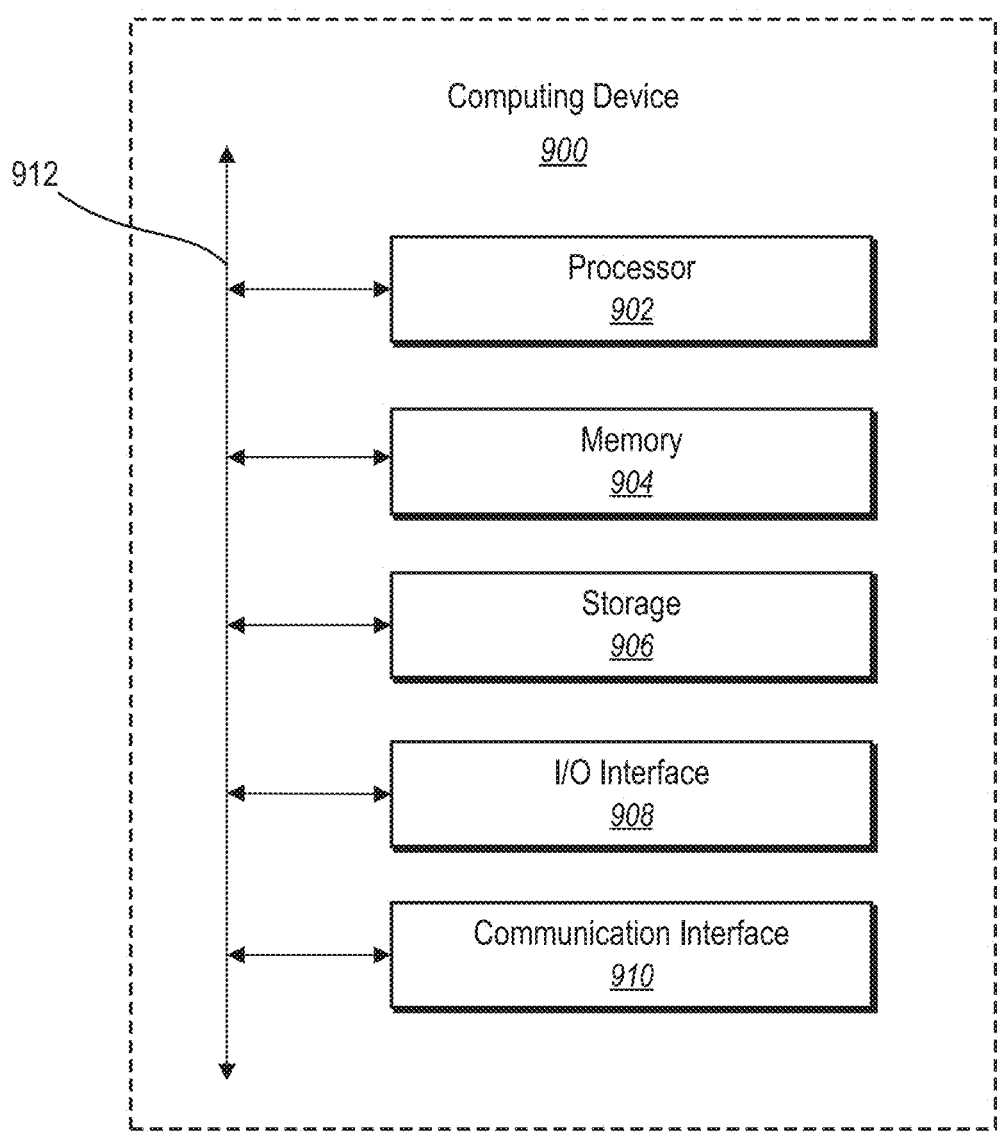
FIG. 9 illustrates a block diagram of an exemplary computing device in accordance with one or more embodiments.

FIG. 9 illustrates a block diagram of exemplary computing device 900 that may be configured to perform one or more of the processes described above. One will appreciate that one or more computing devices such as the computing device 900 may implement the multi-RNN prediction system. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example, and not by way of limitation, to execute instructions for dynamically modifying workflows, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions for performing the methods described herein.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example, and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
   analyze, using natural language processing, a natural language request to generate a desired three-dimensional scene to determine dependencies involving a plurality of entities and one or more commands operating over the plurality of entities of the natural language request;
   generate a semantic scene graph indicating relative positioning of a plurality of objects in a scene based on contextual relationships of the plurality of entities indicated by the determined dependencies and the one or more commands;
   compare the semantic scene graph to semantic scene graphs corresponding to a plurality of existing three-dimensional scenes to identify one or more three-dimensional scenes; and
   generate a three-dimensional scene that fulfills the natural language request utilizing the one or more three-dimensional scenes.

2. The non-transitory computer readable medium as recited in claim 1, wherein the instructions, when executed by the at least one processor, cause the computing device to determine the dependencies by generating a dependency tree.

3. The non-transitory computer readable medium as recited in claim 2, wherein generating the dependency tree comprises setting a verb node as a center of the dependency tree and building the dependency tree based on noun dependencies relative to the verb node.

4. The non-transitory computer readable medium as recited in claim 1, wherein the instructions, when executed by the at least one processor, cause the computing device to generate the semantic scene graph by:
   categorizing base nouns in object categories;
   determining entity counts, entity qualifiers, and relationships; and
   constructing the semantic scene graph to include a plurality of object nodes, one or more relationship nodes, and edges connecting the plurality of object nodes.

5. The non-transitory computer readable medium as recited in claim 4, wherein generating the semantic scene graph comprises setting the edges to indicate a directionality of spatial relationships between the plurality of object nodes.

6. The non-transitory computer readable medium as recited in claim 1, wherein the instructions, when executed by the at least one processor, cause the computing device to compare the semantic scene graph to the semantic scene graphs corresponding to the plurality of existing three-dimensional scenes by generating comparison scores that indicate how similar a structure of the semantic scene graph is to structures of the semantic scene graphs.

7. The non-transitory computer readable medium as recited in claim 1, wherein the instructions, when executed by the at least one processor, cause the computing device to generate the three-dimensional scene that fulfills the natural language request utilizing the one or more three-dimensional scenes by loading a first three-dimensional scene of the one or more three-dimensional scenes.

8. The non-transitory computer readable medium as recited in claim 7, wherein the instructions, when executed by the at least one processor, cause the computing device to generate the three-dimensional scene that fulfills the natural language request by inserting one or more three-dimensional objects from a second three-dimensional scene of the one or more three-dimensional scenes into the loaded first three-dimensional scene.

9. In a digital medium environment for three-dimensional computer modeling, a system for synthesizing three-dimensional scenes using natural language comprising:
   a database of previously generated three-dimensional scenes; and
   at least one processor configured to cause the system to:
      parse, using natural language processing, a natural language phrase comprising a request to generate a desired three-dimensional scene;
      generate, based on the parsing of the natural language phrase, a semantic scene graph of the natural language phrase comprising a plurality of object nodes, one or more relationship nodes, and edges connecting two or more object nodes of the plurality of object nodes via the one or more relationship nodes;
      compare the semantic scene graph of the natural language phrase to semantic scene graphs corresponding to the previously generated three-dimensional scenes to identify one or more three-dimensional scenes; and
      generate a three-dimensional scene that fulfills the natural language phrase utilizing the one or more three-dimensional scenes.

10. The system as recited in claim 9, wherein the at least one processor is further configured to cause the system to set the edges of the semantic scene graph to indicate a directionality of spatial relationships between the two or more object nodes of the plurality of object nodes.

11. The system as recited in claim 9, wherein the at least one processor is further configured to cause the system to:
   generate a ranking of the previously generated three-dimensional scenes based on a similarity of the semantic scene graph of the natural language phrase and the semantic scene graphs of the previously generated three-dimensional scenes; and
   select, from the previously generated three-dimensional scenes, the one or more three-dimensional scenes based on the ranking.

12. The system as recited in claim 11, wherein the at least one processor is further configured to cause the system to generate the three-dimensional scene that fulfills the natural language phrase utilizing the one or more three-dimensional scenes by loading a highest ranking three-dimensional scene of the one or more three-dimensional scenes.

13. The system as recited in claim 9, wherein the at least one processor is further configured to cause the system to generate a dependency tree based on the parsing of the natural language phrase by setting a verb node as a center of the dependency tree and building the dependency tree based on noun dependencies relative to the verb node.

14. The system as recited in claim 13, wherein the at least one processor is further configured to cause the system to generate an entity-command representation of the natural language phrase from the dependency tree, the entity-command representation comprising a list of entities annotated with corresponding attributes and relationships and a list of command verbs which operate over the entities.

15. The system as recited in claim 14, wherein the at least one processor is further configured to cause the system to generate the semantic scene graph of the natural language phrase by converting the entity-command representation into the semantic scene graph.

16. A computer-implemented method of synthesizing three-dimensional scenes using natural language comprising:
   performing an analysis, using natural language processing, of a natural language request to generate a three-dimensional scene;
   generate a semantic scene graph of the natural language request, based on the analysis, comprising a plurality of object nodes, one or more relationship nodes, and edges connecting the plurality of object nodes;
   compare the semantic scene graph of the natural language request to semantic scene graphs corresponding to a plurality of existing three-dimensional scenes to identify one or more three-dimensional scenes; and
   generate a three-dimensional scene that fulfills the natural language request utilizing the one or more three-dimensional scenes.

17. The computer-implemented method as recited in claim 16, wherein generating the semantic scene graph of the natural language request comprises setting the edges to indicate a directionality of spatial relationships between the plurality of object nodes.

18. The computer-implemented method as recited in claim 16, wherein generating the three-dimensional scene that fulfills the natural language request comprises loading a first three-dimensional scene of the one or more three-dimensional scenes that is most similar to the semantic scene graph of the natural language request.

19. The computer-implemented method as recited in claim 18, wherein generating the three-dimensional scene that fulfills the natural language request comprises inserting one or more three-dimensional objects from a second three-dimensional scene of the one or more three-dimensional scenes into the loaded first three-dimensional scene.

20. The computer-implemented method as recited in claim 19, wherein inserting the one or more three-dimensional objects from the second three-dimensional scene of the one or more three-dimensional scenes into the loaded first three-dimensional scene is in response to receiving a second natural language request to augment the first three-dimensional scene.

* * * * *